US006574537B2

(12) United States Patent
Kipersztok et al.

(10) Patent No.: US 6,574,537 B2
(45) Date of Patent: Jun. 3, 2003

(54) DIAGNOSTIC SYSTEM AND METHOD

(75) Inventors: Oscar Kipersztok, Redmond, WA (US); Karl J. Rein-Weston, Seattle, WA (US); Scott L. Nelson, Issaquah, WA (US); Glenn A. Dildy, Sammamish, WA (US); Nicholas James Walker, Seattle, WA (US); Susan Chan Chew, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/776,824

(22) Filed: Feb. 5, 2001

(65) Prior Publication Data

US 2002/0138184 A1 Sep. 26, 2002

(51) Int. Cl.[7] .............................................. G06F 19/00
(52) U.S. Cl. ............................. 701/29; 701/33; 701/34; 702/185; 714/25
(58) Field of Search .............................. 701/29, 30, 32, 701/33, 35, 34, 3; 714/26, 25, 46, 11, 712; 702/185, 183

(56) References Cited

U.S. PATENT DOCUMENTS

| 4,796,206 A | * | 1/1989 | Boscove et al. ............... 701/29 |
| 4,943,919 A | | 7/1990 | Aslin et al. ...................... 701/3 |
| 4,954,964 A | | 9/1990 | Singh ........................... 706/11 |
| 5,010,487 A | * | 4/1991 | Stonehocker ................. 701/35 |
| 5,023,791 A | | 6/1991 | Herzberg et al. .............. 701/35 |
| 5,025,392 A | | 6/1991 | Singh ........................... 706/50 |
| 5,036,479 A | | 7/1991 | Prednis et al. ............... 702/121 |
| 5,099,436 A | | 3/1992 | McCown et al. |
| 5,111,402 A | | 5/1992 | Brooks et al. ................. 701/35 |
| 5,161,158 A | | 11/1992 | Chakravarty et al. ......... 714/26 |
| 5,184,312 A | | 2/1993 | Ellis ............................ 702/121 |
| 5,270,920 A | | 12/1993 | Pearse et al. .................... 705/8 |
| 5,293,323 A | | 3/1994 | Doskocil et al. ............. 702/185 |
| 5,396,422 A | * | 3/1995 | Forchert et al. ............... 701/29 |
| 5,408,412 A | | 4/1995 | Hogg et al. ................... 701/33 |
| 5,479,610 A | | 12/1995 | Roll-Mecak et al. .......... 714/25 |
| 5,522,026 A | | 5/1996 | Records et al. |
| 5,524,272 A | | 6/1996 | Podowski et al. ............. 725/74 |
| 5,544,308 A | * | 8/1996 | Giordano et al. ...... 395/183.02 |
| 5,592,614 A | * | 1/1997 | Peters ................... 395/183.02 |
| 5,737,227 A | | 4/1998 | Greenfield et al. ......... 705/400 |
| 5,748,846 A | | 5/1998 | Kirkland et al. .............. 706/14 |

(List continued on next page.)

OTHER PUBLICATIONS

Carl A. Palmer; *Combining Gas Path Analysis with Bayesian Belief Networks—A New Approach used for Test Cell Diagnostics During GE Commercial Jet Engine Overhaul*; DEAN Oct. 17, 1997; pp. 1–19; Enter Software, Inc.

*Primary Examiner*—Tan Q. Nguyen
(74) *Attorney, Agent, or Firm*—Alston & Bird LLP

(57) ABSTRACT

A diagnostic system and method are provided that include an interface for receiving input relating to observed symptoms indicative of one or more failed components, a processing element for correlating the input relating to the observed symptoms with at least one suspect component that is capable of causing the observed symptoms upon failure, and a display for presenting information relating to the suspect components. The processing element correlates the input relating to the observed symptoms with the suspect components in accordance with a diagnostic model constructed based upon systemic information, experiential information and factual information. The processing element generally presents the suspect components in a listing prioritized based upon the relative likelihood that the respective suspect components caused the observed symptoms. Additionally, the processing element can present a prioritized listing of tests that can be conducted to refine the identification and prioritization of the suspect components.

62 Claims, 24 Drawing Sheets

U.S. PATENT DOCUMENTS

| | | | |
|---|---|---|---|
| 5,796,935 A | 8/1998 | Morrison et al. | 714/11 |
| 5,931,877 A | 8/1999 | Smith et al. | 701/29 |
| 5,987,443 A | 11/1999 | Nichols et al. | 706/11 |
| 6,003,021 A | 12/1999 | Zadik et al. | 706/47 |
| 6,003,808 A | 12/1999 | Nguyen et al. | 244/1 R |
| 6,012,152 A * | 1/2000 | Douik et al. | 714/26 |
| 6,064,998 A | 5/2000 | Zabloudil et al. | 706/45 |
| 6,067,537 A | 5/2000 | O'Connor et al. | 706/47 |
| 6,067,538 A | 5/2000 | Zorba et al. | 706/47 |
| 6,073,127 A | 6/2000 | Lannert et al. | 706/45 |
| 6,085,184 A | 7/2000 | Bertrand et al. | 706/45 |
| 6,122,575 A | 9/2000 | Schmidt et al. | 701/29 |
| 6,301,531 B1 * | 10/2001 | Pierro et al. | 701/29 |

* cited by examiner

FIG. 5A.

Mechanic's Compass

Tail Number

Please enter the Tail Number for the plane

Tail #:

Exit    Next

FIG. 5B.

Mechanic's Compass

Tail Number

Please enter the Tail Number for the plane

AA001
AA002
AA003

Next

Mechanic's Compass

Tail Number

Please enter the Tail Number for the plane

Tail #: AA001

Exit  Next

Go forward to Crew Report

Mechanic's Compass - Other Functions [X]

| Schematic | Crew Report | New Tail # | Exit |

| MEL/Time/Parts | Summary Log | Change Subsystem |

1) Knowns - Tail #AA001 (737-300)

Flight stages is climb
Duct Pressure Indicator is zero

Click on item to change state

Reset

2) Possible Causes - ATA 36: Pneumatics [X]

Bleed Air Regulator
Pre-cooler control valve
PRSOV
High stage valve
450 deg thermostat Top 5 ▽

Details

3) Tests - ATA 36: Pneumatics [X]

Precooler Valve Position Indicator Test
PRSOV Position Indicator Test
High Stage Valve Position Indicator Test
Bleed Air Reg. Control Sense Line Leakin
High Stage Control Sense Lines Leaking Top 5 ▽

Double Click on item to run test

Weights    Details

System Cost Weight [X]

Information Driven ⇨——————— Time Driven 0.00

OK    Cancel    More>>

FIG. 5H.

Mechanic's Compass - Other Functions ☒

| Schematic | Crew Report | New Tail # | Exit |
| MEL/Time/Parts | Summary Log | Change Subsystem |

1) Knowns - Tail #AA001 (737-300) ☒

Flight stages is climb
Duct Pressure Indicator is zero

Click on item to change state

[ Reset ]

2) Possible Causes - ATA 36: Pneumatics ☒   [Top 5 ▽]

Bleed Air Regulator
Pre-cooler control valve
PRSOV
High stage valve
450 deg thermostat

[ Details ]

3) Tests - ATA 36: Pneumatics ☒   [Top 5 ▽]

Precooler Valve Position Indicator Test
PRSOV Position Indicator Test
High Stage Valve Position Indicator Test
Bleed Air Reg. Control Sense Line Leaking
High Stage Control Sense Lines Leaking Double Click on item to run test

[ Weights ]   [ Details ]

System Cost Weight ☒

Information Driven — [0.47] ▷ — Time Driven

[ OK ]  [ Cancel ]  [ More>> ]

FIG. 5L.

Mechanic's Compass - Other Functions

Schematic

Summary Log - ATA 36: Pneumatics

Date: 4/21/00   Time: 11:30:21 A   Model: 737-300   Tail #: AA001   Engine: Pratt & Whitne ATA 36: Pneumatics Change Subsystem Mechanic: Christopher Esposito

Log Book Entries
Flight stages is climb
Duct Pressure Indicator is zero

Tests and Results
PRSOV Postion Indicator Test is failed close/open

Probability  Probable Causes
1.000   PRSOV
0.000   Bleed Air Regulator
0.000   Pre-cooler control valve
0.000   High stage valve
0.000   450 deg thermostat

Actions Taken

Actions Deferred

Weights   Details   Close   Print   Save

FIG. 5M.

Mechanic's Compass - Other Functions

Summary Log - ATA 36: Pneumatics

Date: 4/21/00   Time: 11:30:21 A   Model: 737-300   Tail #: AA001   Engine: Pratt & Whitne ATA 36: Pneumatics Change Subsystem Mechanic: Christopher Esposito

Log Book Entries
Flight stages is climb
Duct Pressure Indicator is zero

Tests and Results
PRSOV Postion Indicator Test is failed close/open

Probability  Probable Causes
1.000   PRSOV
0.000   Bleed Air Regulator
0.000   Pre-cooler control valve
0.000   High stage valve
0.000   450 deg thermostat

Actions Taken
Closed and locked valve-part # 3214552

Actions Deferred
Defer maintenance to overnight stop.

[Close]  [Print]  [Save]

[Weights]  [Details]

FIG. 5Q.

DIAGNOSTIC SYSTEM AND METHOD

FIELD OF THE INVENTION

The present invention relates generally to diagnostic systems and methods and, more particularly, to diagnostic systems and methods for troubleshooting a complex system, such as an aircraft, to identify one or more components, such as one or more line replaceable units (LRUs) or lower level components, that has failed.

BACKGROUND OF THE INVENTION

Maintenance, including the reliable troubleshooting of complex systems, is a common issue in various industries, including the aircraft and automotive industries, the electronics industry and the like. In the aircraft industry, for example, maintenance of an aircraft is of paramount importance to ensure the continued safe and efficient operation of the aircraft. Aircraft maintenance can occur in several different manners. For example, scheduled maintenance generally includes a number of specific tasks, inspections and repairs that are performed at predetermined intervals. These events are scheduled in advance and rarely result in aircraft schedule interruption. In contrast, unscheduled maintenance is performed as required to maintain the aircraft's allowable minimum airworthiness during intervals between scheduled maintenance. Unscheduled maintenance is usually performed while the aircraft is on the ground between flights. However, unscheduled maintenance may be performed during a scheduled maintenance check if a mechanic identifies a problem that was not anticipated. Minimum ground time between flights is desirable to maximize airplane utilization and to meet the established flight schedules. Therefore, the time allocated to unscheduled maintenance is often limited to the relatively short time that the aircraft is required to be at the gate in order to permit passengers to unload and load, to refuel and to otherwise service the aircraft, all of which may take approximately 20 to 120 minutes on average depending on the aircraft type and route to be flown next.

As explained below, it is oftentimes difficult to complete the unscheduled maintenance in this timeframe, thereby leading to flight delays and/or cancellations. These flight delays and/or cancellations are extremely costly to an airline, both in terms of actual dollars and in terms of passenger perception. In this regard, an airline typically begins accruing costs related to a flight delay following the first five minutes of a delay, with substantial costs accruing if the flight must be cancelled. Moreover, as all air passengers are aware, airline dispatch reliability is a sensitive parameter that airlines often use to distinguish themselves from their competitors.

Notwithstanding the critical importance of properly performing unscheduled maintenance in both an accurate and timely manner, mechanics who perform the unscheduled maintenance on the flight line face a daunting challenge. In this regard, in addition to the time pressures described above, these mechanics are generally required to troubleshoot the aircraft based upon a limited amount of information that has been provided by the flight, cabin or maintenance crew or by onboard computers, sensors or the like. While troubleshooting any system based upon this limited information would be difficult, troubleshooting an aircraft which is an extremely large and complex system comprised of many interconnected subsystems is particularly difficult. In this regard, each subsystem is also typically comprised of a many LRUs that are designed to be individually replaced.

An LRU may be mechanical, such as a valve or a pump; electrical, such as a switch or relay; or electronic, such as an autopilot or a flight management computer. Many LRUs are, in turn, interconnected. As such, the symptoms described by flight deck effects or other observations may indicate that more than one LRU can explain the presence of the observed symptoms. At that point, there is ambiguity about which LRU(s) have actually failed. Additional information will be needed to disambiguate between the possibilities.

A mechanic must therefore troubleshoot the problem to one or more suspect LRUs, with the number of LRUs preferably being minimized to prevent an excessive number of LRUs that are functioning properly from being replaced. A mechanic must then decide if the suspect LRU(s) must be immediately repaired or replaced prior to further flight of the aircraft or, if the repair or replacement of such LRU(s) may be safely deferred until the completion of the day's flights for the aircraft in order to avoid further delay of the aircraft. In this regard, a minimum equipment list (MEL) is generally maintained for each model of aircraft. The MEL indicates which components must be functioning properly in order for the aircraft to be cleared for takeoff. As such, a mechanic generally determines if any of the suspect LRUs are on the MEL and, if so, must repair or replace each suspect LRU that is on the MEL. If a suspect LRU must be immediately replaced, the mechanic removes the LRU, obtains a replacement LRU and installs the replacement LRU. If the subsystem is capable of being tested while the aircraft is on the ground, the mechanic then generally tests the subsystem to insure that the problem is corrected by the replacement LRU. Unfortunately, the more ambiguity there is between the suspect LRUs, the more difficult it is to single out the truly faulty LRUs and the more prone a mechanic is to want to replace all suspect parts, rather than continue to troubleshoot to disambiguate and narrow the field of suspect LRUs.

Following departure of the aircraft, the LRUs that have been removed are generally tested to determine if the LRUs are defective and, if so, which component(s) of the LRU failed. These tests frequently determine that many of the LRUs that are replaced are actually functioning properly. However, a mechanic, in his/her haste to return an aircraft to service, may skip tests that are necessary to refine the troubleshooting from a handful of suspect LRUs to a specific one or two suspect LRUs since the time required for the tests may cause the upcoming flight to be delayed or cancelled. As will be apparent, however, the replacement of LRUs that are actually functioning properly increases the costs to maintain the aircraft, both in terms of the cost of the parts and the labor. Additionally, the replacement of LRUs that are functioning properly may cause an excessive number of LRUs to be maintained in inventory, thereby also increasing inventory costs associated with the maintenance of the aircraft. As such, it would be desirable to improve the diagnosis ability and knowledge of ground crew mechanics and their ability to make decisions about how to streamline the diagnostic decision making process, i.e., by having a good understanding of the most cost effective and informative actions to take under various different circumstances.

A mechanic may be notified of a problem with an aircraft either while the aircraft is still in route or once the aircraft has landed. If a mechanic is notified while the aircraft is in route, the mechanic is provided with a description of the problems and other observations or symptoms noted by the flight or cabin crew so that the mechanic can begin the troubleshooting process prior to the arrival of the aircraft at the gate, thereby somewhat reducing any delays associated with the repair. More commonly, however, a mechanic is notified once the aircraft arrives at the gate that a problem has been identified by the flight, cabin or maintenance crew and is provided with a list of any observations or symptoms noted by the crew. In some instances, the mechanic may be able to obtain additional information related to the problem from various onboard computers, sensors or the like.

In a few instances involving common or repeated problems, an experienced mechanic may be able to immediately identify the suspect LRU based only upon the problem and the accompanying symptoms. Normally, however, the mechanic must work through a fairly complicated troubleshooting procedure which attempts to identify the suspect LRU(s) based upon the problem and the accompanying symptoms and, in many instances, based upon the results of one or more additional tests that are performed in an attempt to isolate the suspect LRU.

Since the aircraft includes a complex network of interconnected LRUs and since the propagation of any fault through the system is equally complex, fault isolation manuals (FIMs) have been developed for a number of different aircraft models to guide a mechanic through the troubleshooting process. Similarly, airline maintenance manuals (AMMs) have been developed that include guidance for a mechanic through troubleshooting processes. Unfortunately, these manuals are voluminous, and oftentimes include a number of supplements or updates that must be cross-referenced in order to appropriately troubleshoot the aircraft. These manuals are oftentimes maintained in a central repository or technical library at the airport and are not immediately available to a mechanic who is repairing an aircraft at the gate. As such, a mechanic must sometimes copy the pages of the manual that seem to be most relevant and proceed to the gate to repair the aircraft. If, however, the troubleshooting process proceeds in a manner not anticipated by the mechanic, the mechanic may have to return to the library to reference or copy additional pages of the manuals, thereby further slowing the troubleshooting process. As such, portable electronic maintenance aids have been developed in order to maintain a portable library of maintenance documents for mechanics. However, it would be desirable to provide still additional information to the mechanic at the gate to facilitate the troubleshooting process.

Even with the appropriate manuals to guide the troubleshooting process, a mechanic may have difficulty troubleshooting a problem and may need to contact a representative of the aircraft manufacturer for assistance, thereby further delaying the troubleshooting process. In addition, experienced mechanics oftentimes know tricks of the trade or other unwritten rules which greatly expedite the troubleshooting process, especially in instances in which the faults are multiple, intermittent, repeating or cross-system in nature or in instances in which problems which problems with one LRU are actually attributable to another faulty LRU that is connected, directly or indirectly, to the LRU experiencing the problem. Unfortunately, the average experience level of the mechanics servicing the aircraft is gradually diminishing such that fewer and fewer mechanics actually know these tricks of the trade or unwritten rules that otherwise serve to expedite the troubleshooting process. As such, it would be desirable to provide all mechanics with the tricks-of-the-trade and the other unwritten rules that have been developed over the years by experienced mechanics to streamline the troubleshooting process.

Once the mechanic identifies one or more suspect LRUs, the mechanic determines if the LRUs are to be repaired or replaced. If the aircraft has completed its operations for the day, the mechanic typically determines if the LRU can be repaired or should be replaced. If the LRU is to be replaced, the mechanic determines if replacement LRUs are available in inventory. This determination generally involves the mechanic's review of a listing of the LRUs in inventory. If the LRUs that are to be replaced are in inventory, the mechanic obtains the necessary LRUs and replaces the suspect LRUs with LRUs from inventory. If, however, the aircraft has additional flights scheduled for later in the day, the mechanic generally determines if the suspect LRU(s) are necessary for continued operation of the aircraft by consulting a minimum equipment list (MEL). If the MEL indicates that the LRU is necessary for continued operation of the aircraft, the mechanic continues, as described above, by determining if the LRU can be repaired and, if not, by determining if the LRU is available in inventory and, if so, obtaining a replacement LRU and swapping the replacement LRU for the suspect LRU. However, if the MEL indicates that the LRU is not necessary for continued operation of the aircraft, the mechanic may defer replacement of the suspect LRU until completion of the operations of the aircraft for the day in order to prevent further delay or cancellation of the aircraft's remaining flights.

As will be apparent, aircraft maintenance is of critical importance for a number of reasons. Moreover, the performance of aircraft maintenance, especially unscheduled maintenance, in a reliable and timely fashion is desirable in order to minimize any delays or cancellations due to maintenance work. Additionally, it is desirable to fully troubleshoot a problem such that a minimum number of suspect LRUs is replaced in order to reduce the maintenance costs and to permit inventory to be more closely controlled. As described above, maintenance operations, especially unscheduled maintenance operations, include a very complicated troubleshooting process which oftentimes requires a mechanic to reference one or more manuals that outline the process and, even if performed correctly, may require an aircraft to be on the ground in repair for an undesirably long period of time. As such, an improved diagnostic system and method for identifying the faulty components of an aircraft is desired. This improved diagnostic system and method is especially important for unscheduled maintenance such that the troubleshooting process can be expedited in order to reduce the number of flights that have to be delayed or cancelled as a result of maintenance delays. Similarly, the maintenance of other types of complex systems in other industries is also important and it would also be desirable for any improved diagnostic system and method to be equally applicable to a wide variety of complex systems from different industries, including the automotive, marine, electronics and power generation industries.

SUMMARY OF THE INVENTION

An improved diagnostic system and method are therefore provided for identifying a component, such as an LRU or a lower level internal component within an LRU, that has failed. The diagnostic system and method of the present invention facilitates the troubleshooting process in order to decrease the time required to perform unscheduled maintenance while maintaining or improving the reliability of the maintenance operations. In the aircraft industry, the improved diagnostic system and method of the present invention may reduce the number of flights that must be delayed or cancelled as a result of unscheduled maintenance. Moreover, the diagnostic system and method of the present invention should refine the troubleshooting process and reduce the number of components that are replaced, but actually function properly, thereby permitting inventory to be more closely controlled.

The diagnostic system includes a user interface for receiving input relating to observed symptoms indicative of one or more failed components, a processing element for correlating these inputs with at least one component that is capable of causing the observed symptoms, and a display for presenting information to the user relating to the suspect component(s). The processing element preferably correlates the input relating to the observed symptoms with the suspect component(s) in accordance with a diagnostic model that is constructed using systemic information relating to the components and their input-output relationships, experiential information relating to direct relationships between component failures and the observed symptoms, and factual information relating to component reliability. As such, the processing element includes a number of the tricks of the trade and unwritten rules known by the most experienced mechanics to permit the diagnostic system to perform the troubleshooting process in the most efficient manner.

The diagnostic model includes a plurality of nodes interconnected by a number of arcs in a manner defined by the systemic information and the experiential information. The model includes nodes representing the components, the observed symptoms, and the tests. Each node has at least two states and the diagnostic model assigns a probability to each state of a node based upon the systemic information, the experiential information and/or the factual information. Using such a diagnostic model, the processing element can determine the probability of failure for each component that may have caused the observed symptoms.

The processing element correlates the input relating to the observed symptoms with a plurality of components from one or more subsystems that are capable of causing the observed symptoms upon failure. The processing element prioritizes the suspect components based upon the relative likelihood of casualty, i.e., that the respective suspect components caused the observed symptoms. The processing element is also capable of identifying test(s) to be performed in order to refine the prioritization of the suspect components. The display can present a prioritized listing of the plurality of suspect components and an indication of the test(s) to be performed in order to refine the prioritization of the plurality of suspect components.

The processing element is preferably capable of prioritizing the tests based upon at least one predetermined criteria. The processing element is also preferably capable of reprioritizing the tests based upon revised criteria. For example, the tests may be prioritized based upon the time required to perform the tests, or the amount of information obtained from the test. Regardless of the manner in which the plurality of tests are prioritized, the processing element is capable of receiving and analyzing data from a test and reprioritizing the suspect components based upon the outcome of the tests.

The processing element may also be capable of identifying additional information relating to at least one suspect component. Typically, the additional information relates either to component availability, the time to repair or replace the suspect component, or the cost to repair or replace the suspect component. The display also preferably presents the additional information for review by the mechanic. This diagnostic system may therefore include at least one database for storing the additional information. The database can include schematic images of the suspect component that can be displayed during replacement or repair of the suspect component. While displaying the schematic images, the display may also indicate the relative likelihood of component failure. In addition, the database can include a minimum equipment list. The display will then be capable of indicating the respective suspect components that are on the minimum equipment list. With this information, a mechanic can quickly determine if the suspect component must be repaired or replaced or if the repairs can be deferred. The database may include an inventory of components. The display will then be capable of indicating the respective suspect components that are in inventory and therefore available to the mechanic. Similarly, the database can include text descriptions of the suspect components which can also be presented upon the display for review by the mechanic.

In correlating the observed symptoms with one or more suspect components, the processing element may identify suspect components of a plurality of different subsystems, i.e., suspect subsystems. As such, the display may be capable of listing the suspect subsystems and the interface may be capable of receiving input indicative of the respective suspect subsystem to be further analyzed. Based upon this input, the processing element can prioritize suspect components of the selected subsystem and the display can present the prioritized listing of the suspect components of the selected subsystem as described above.

Following completion or deferral of the repair or replacement of the suspect component, the diagnostic system permits the mechanic to record whatever remedial action was taken. In this regard, the interface is capable of receiving data relating to remedial actions undertaken with respect to at least one suspect component. If maintenance actions were deferred, this data may be used to notify others of the need to perform the deferred maintenance. This data can be included within the airplane's maintenance log.

According to the present invention, an improved diagnostic system is provided to troubleshoot a complex system, such as an aircraft. In addition, a corresponding method for troubleshooting a complex system is provided. The diagnostic system and method permit the suspect components to be reliably identified and to be ranked based upon the probability that a respective suspect component caused the problem. In addition, one or more tests that would be useful to refine the prioritization of the suspect components can be identified. As such, a mechanic can quickly identify components that must be repaired or replaced. By linking to additional information, the mechanic can also quickly determine if the suspect components are on the minimum equipment list and are in inventory, as well as additional information, such as schematics and textual descriptions of the suspect components. The diagnostic system and method should therefore permit troubleshooting to occur more quickly such that the overall time for repair is reduced which correlates, in the aircraft industry, to a corresponding reduction in the number of flights that are delayed or cancelled due to unscheduled maintenance. By reliably troubleshooting an aircraft, the diagnostic system and method may also insure that a greater percentage of the components that are replaced are actually faulty, thereby decreasing maintenance costs and improving inventory control relative to conventional troubleshooting processes that oftentimes replace components that are still operational.

BRIEF DESCRIPTION OF THE DRAWINGS

Figure 1:
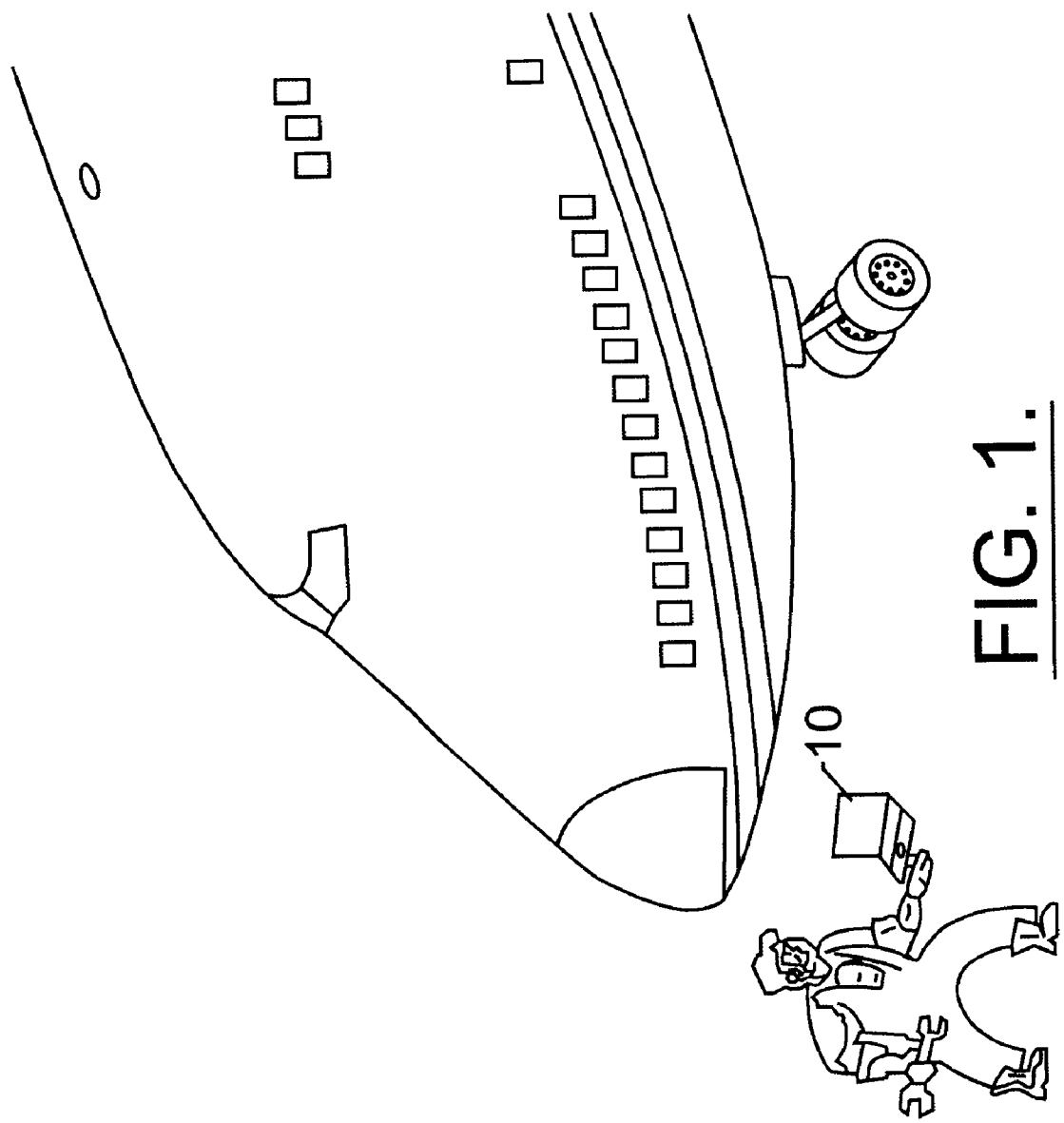
Figure 2:
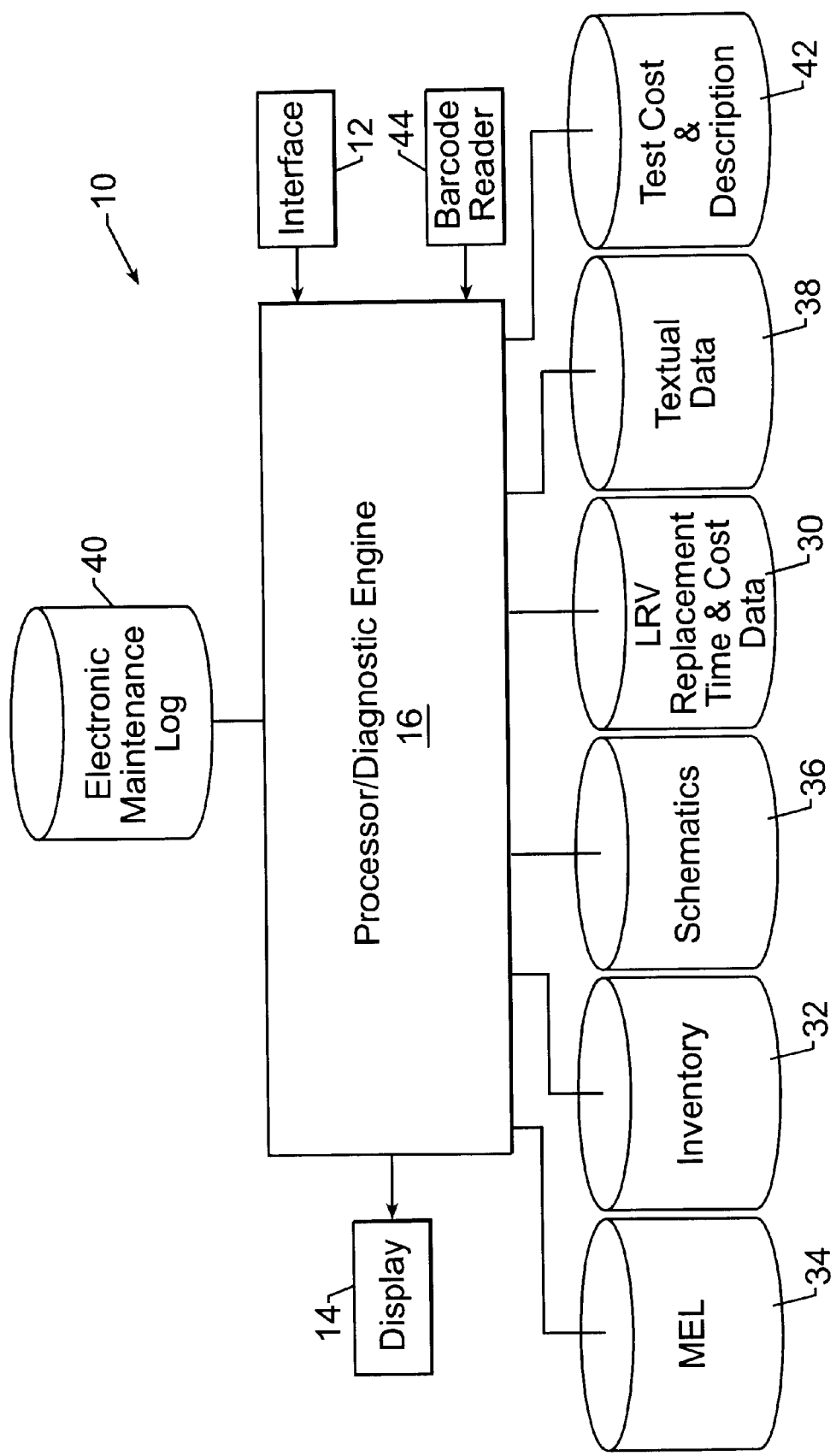
Figure 3:
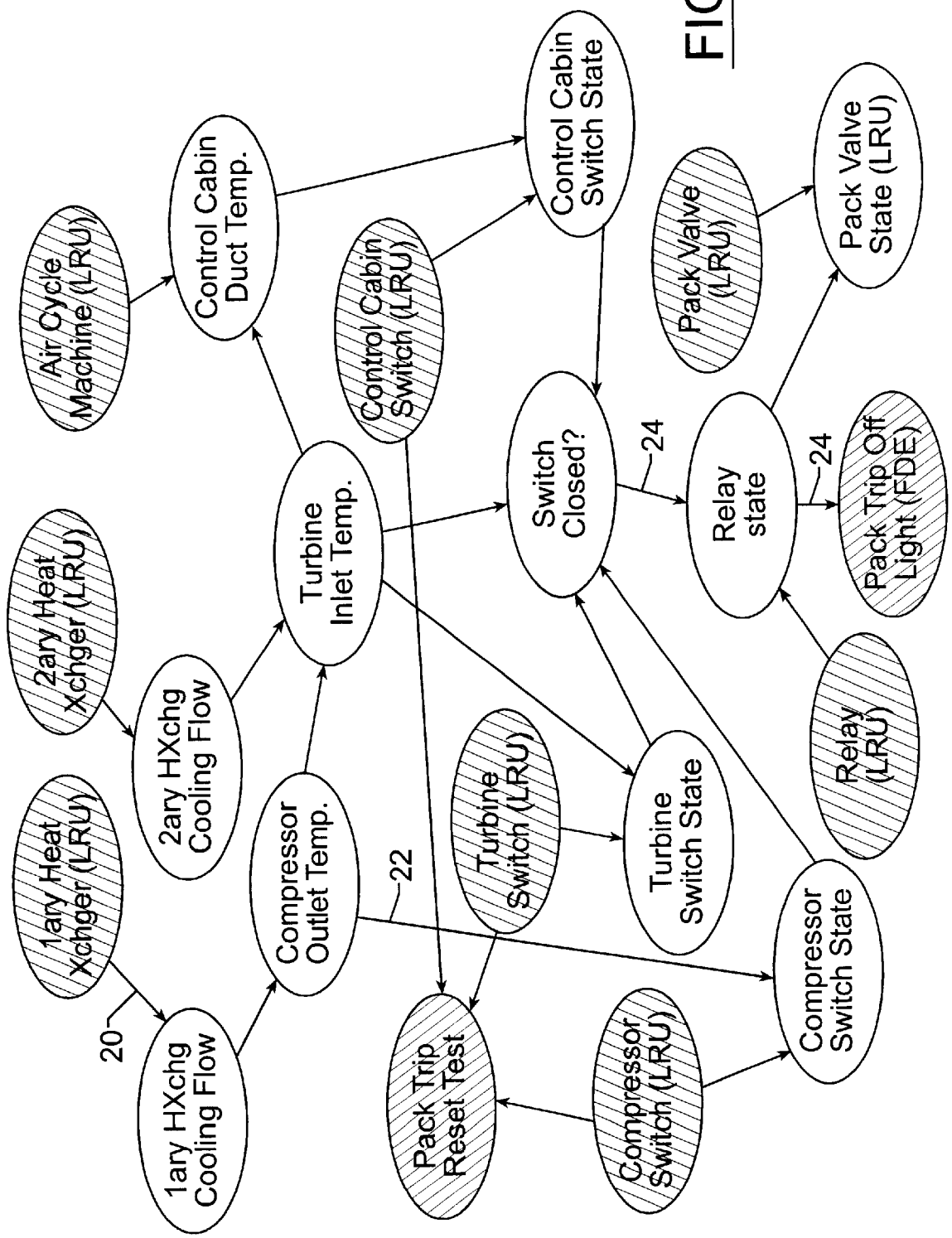
Figure 4:
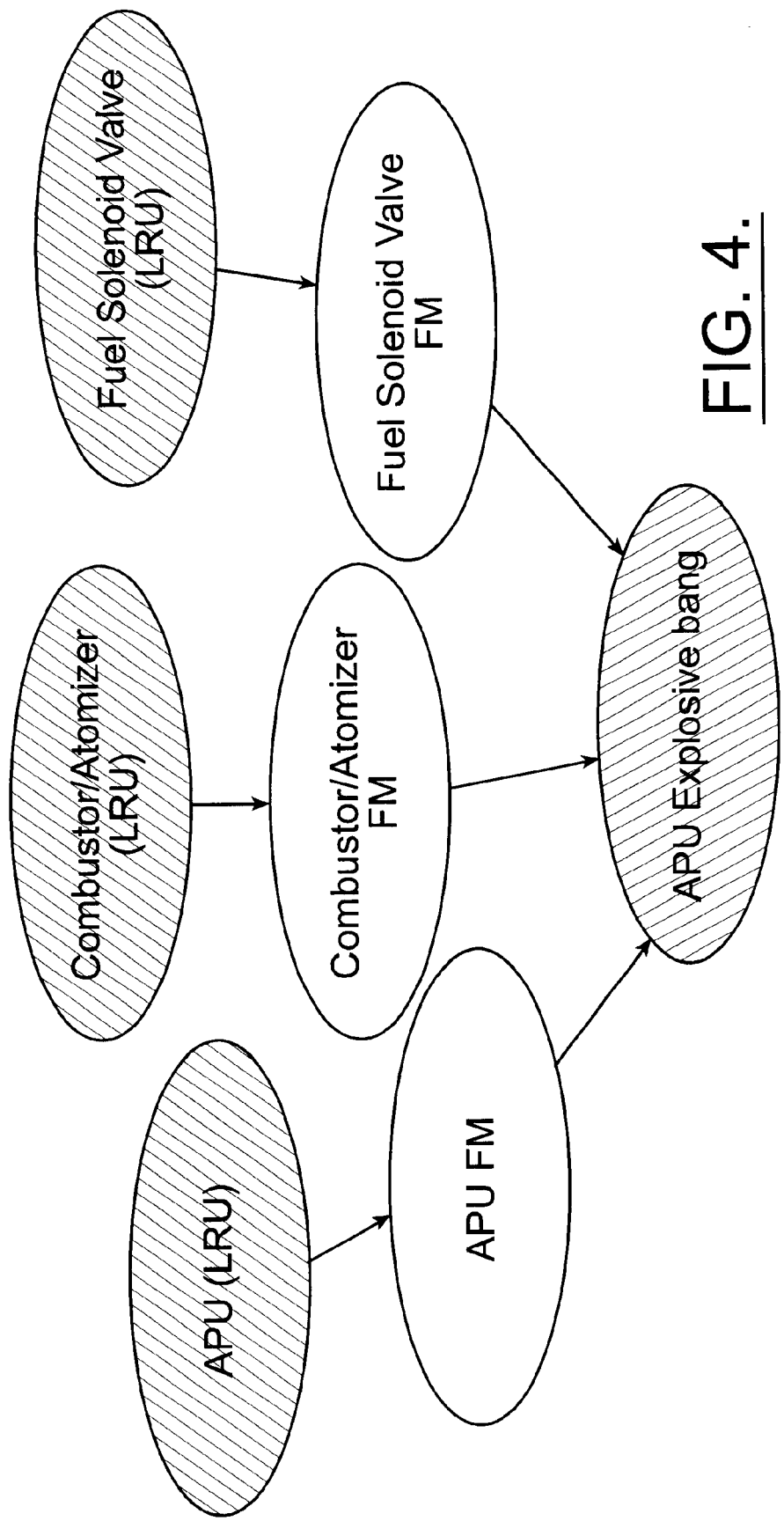
Figure 5D:
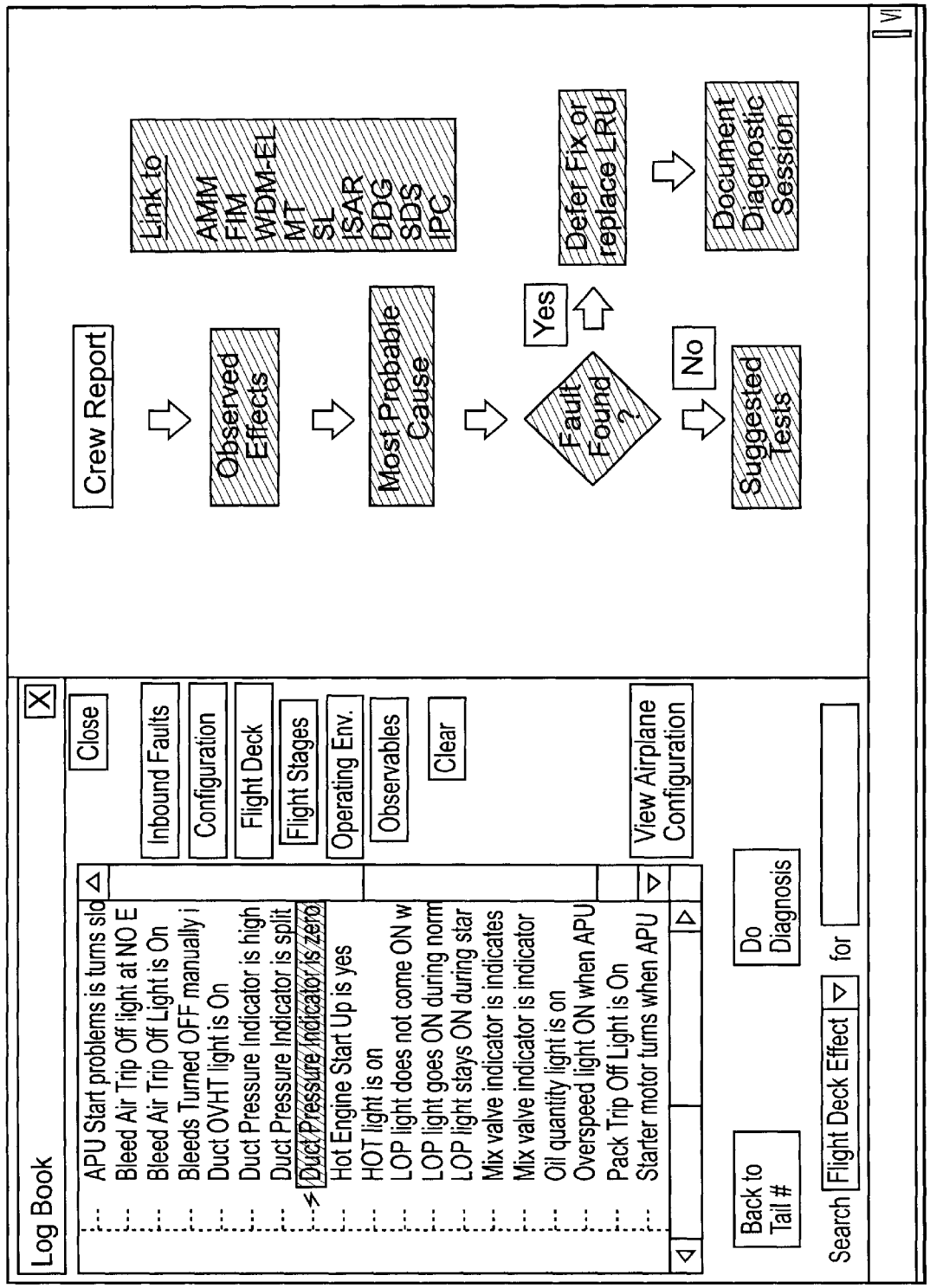
Figure 5E:
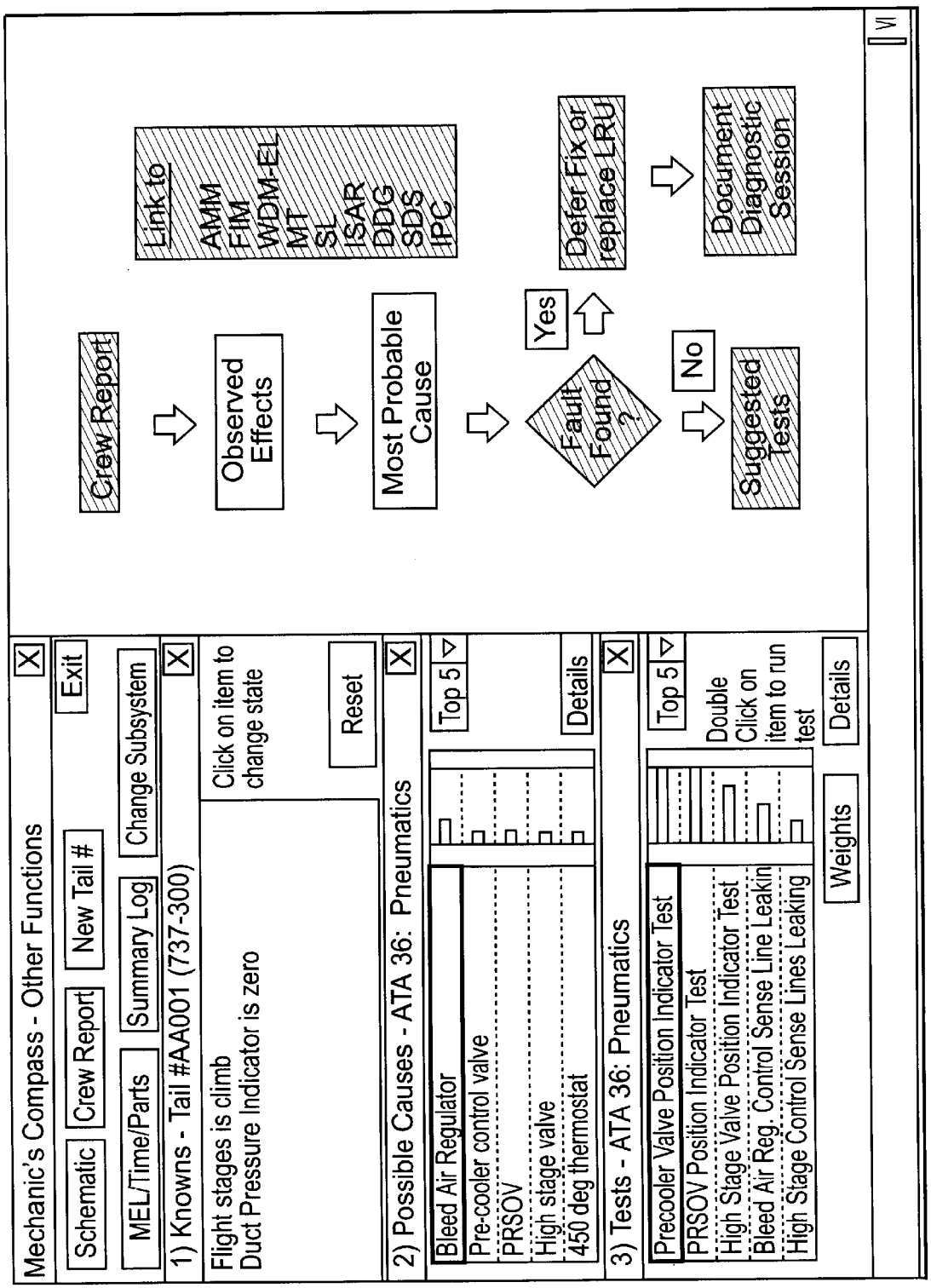
Figure 5G:
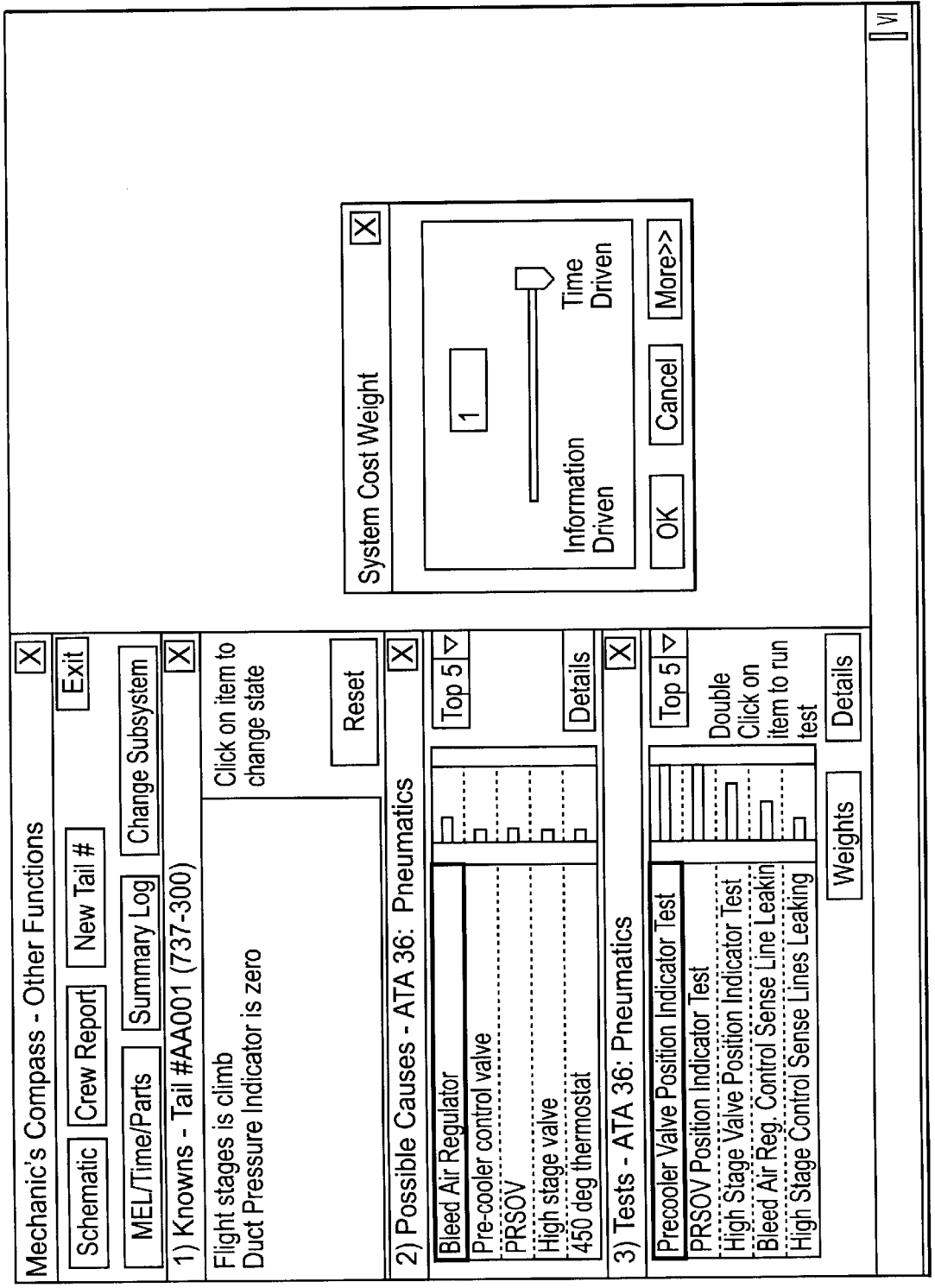
Figure 5I:
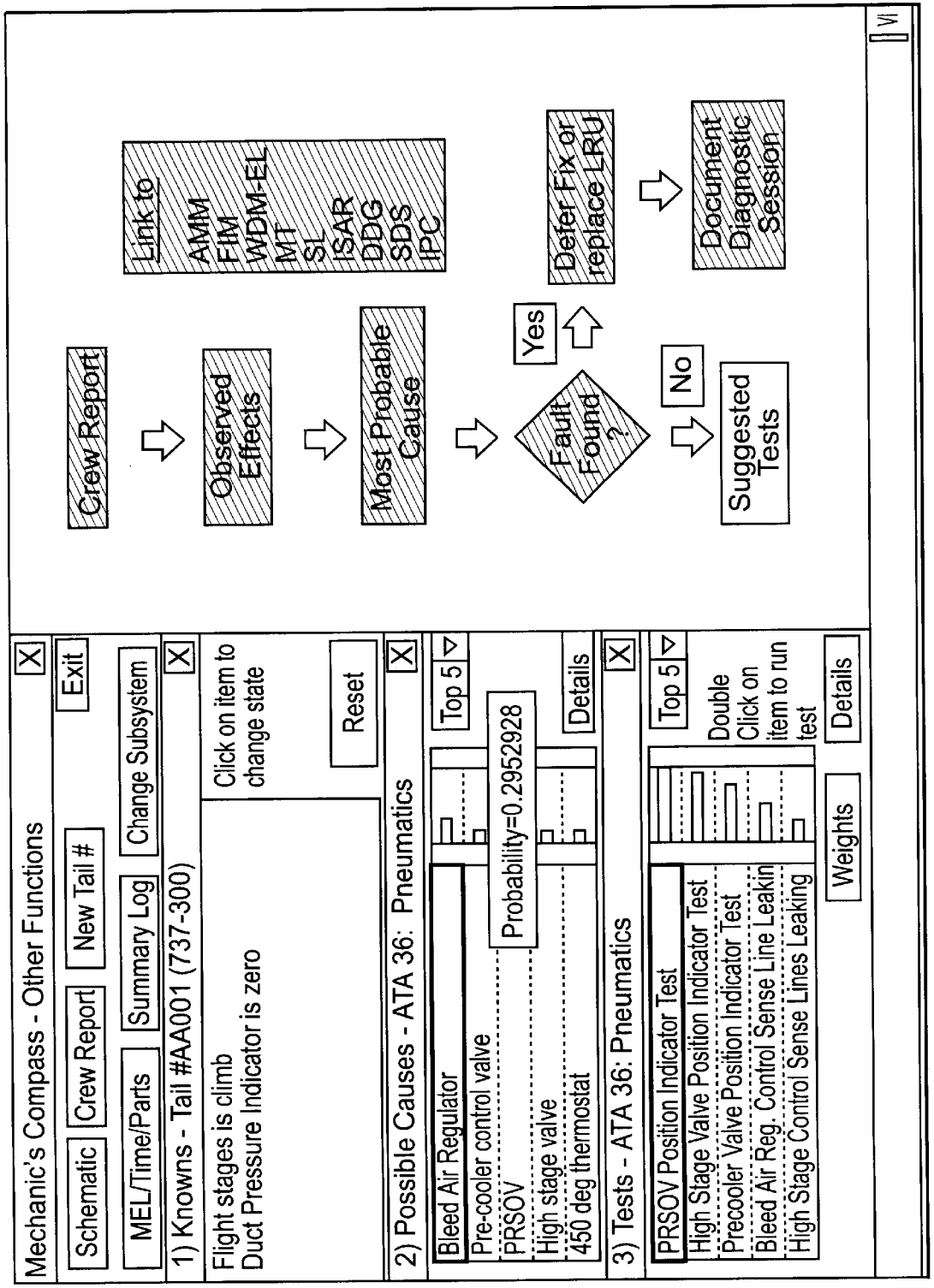
Figure 5J:
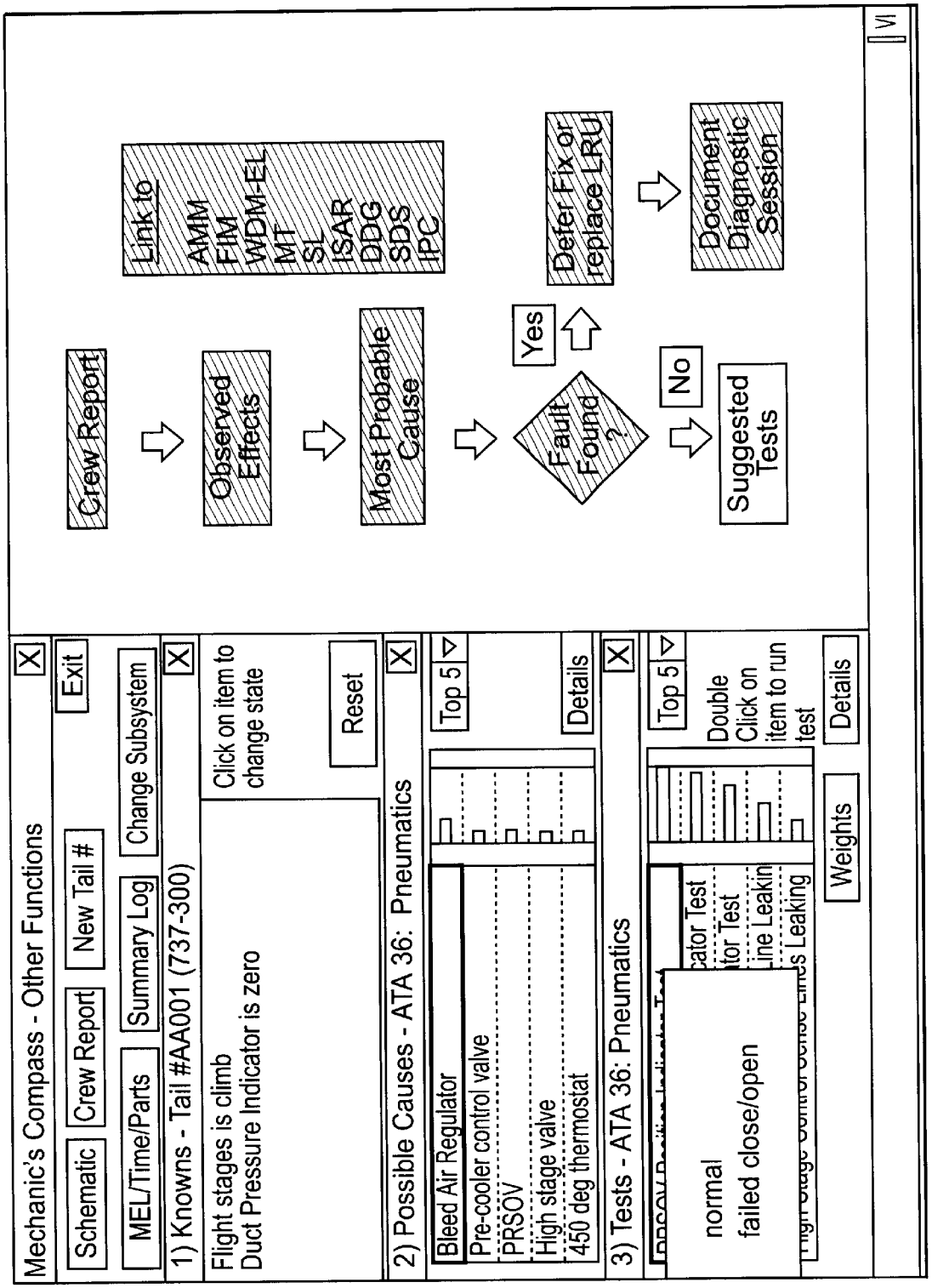
Figure 5K:
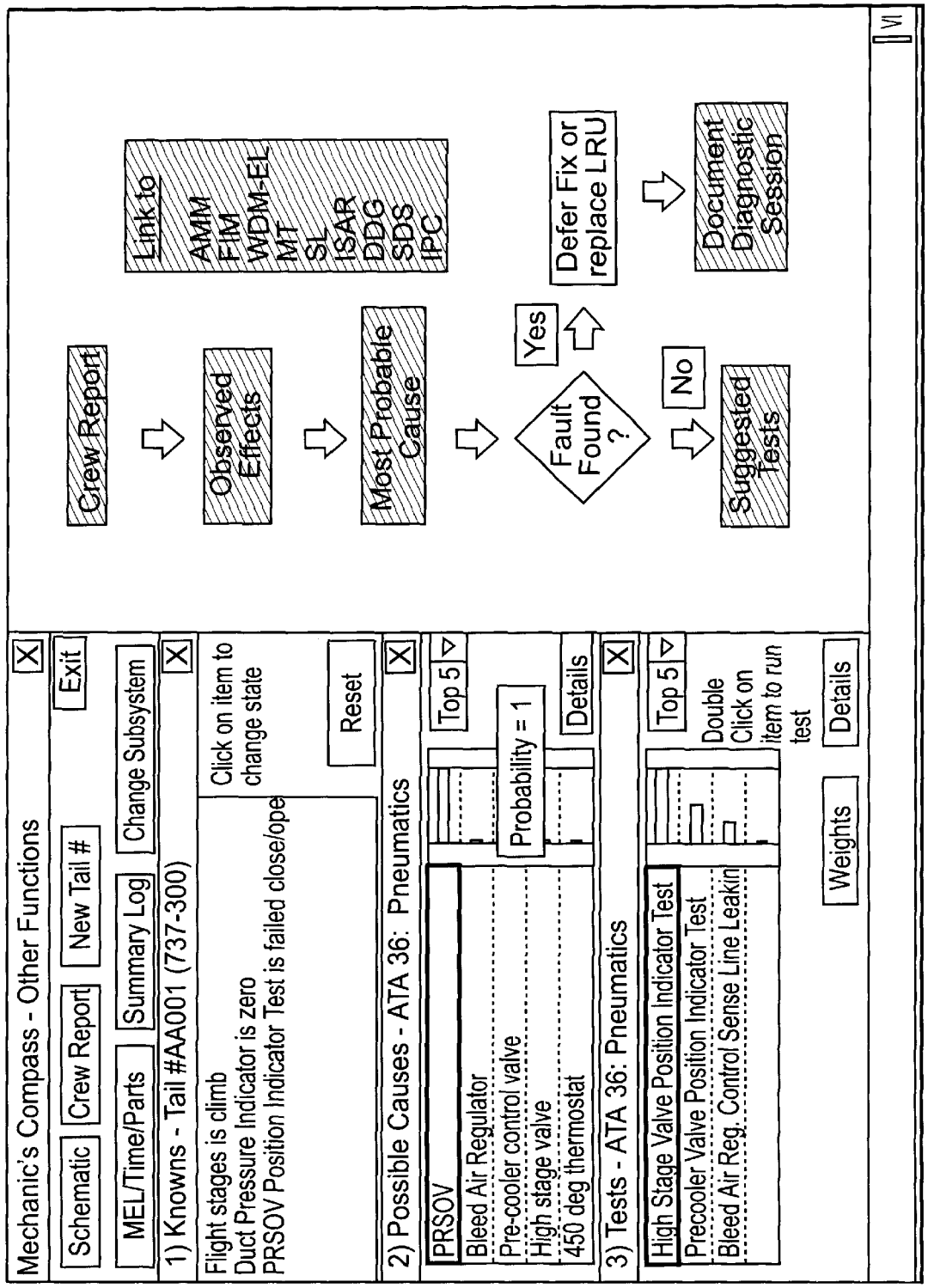
Figure 5N:
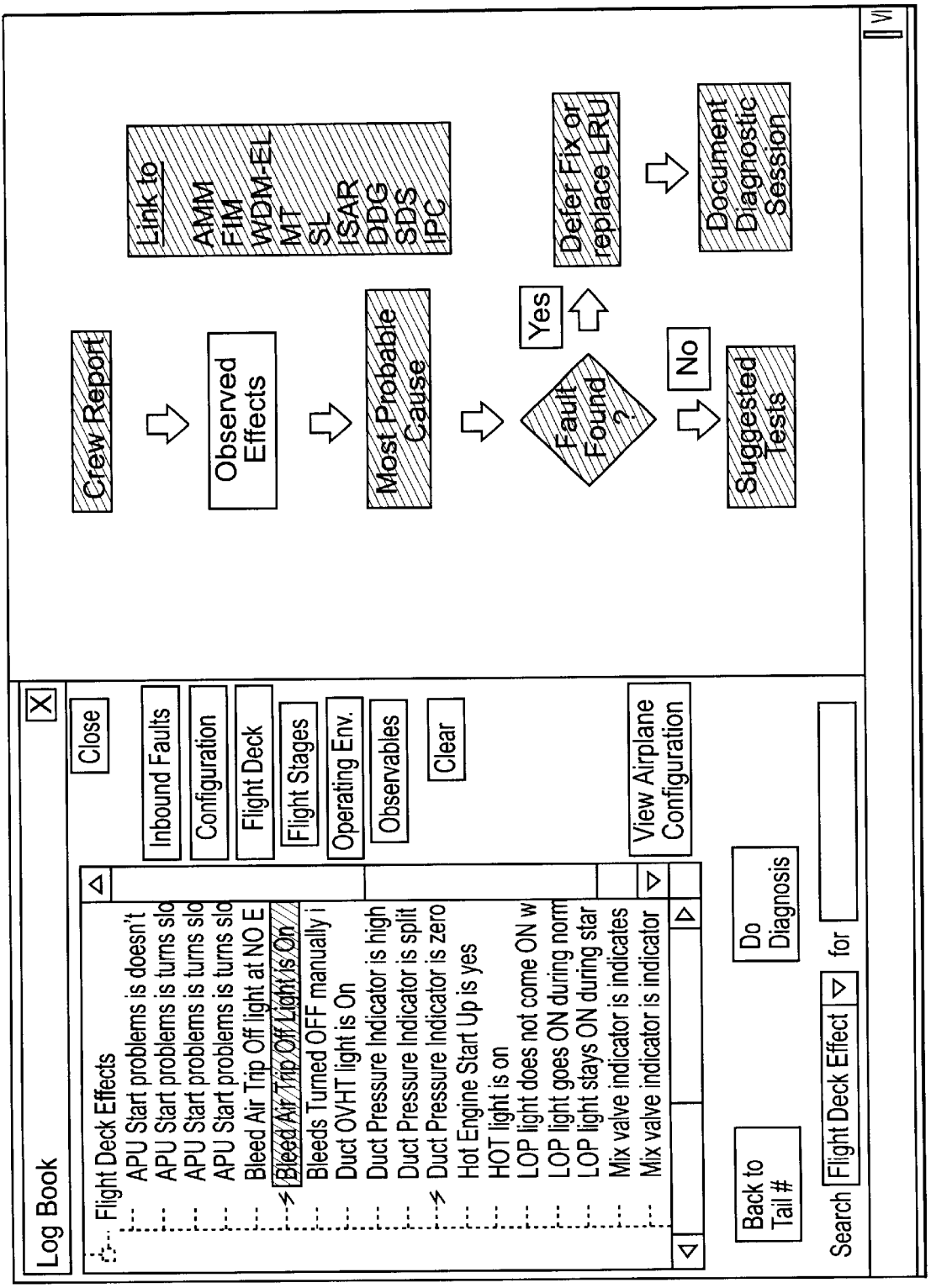
Figure 50:
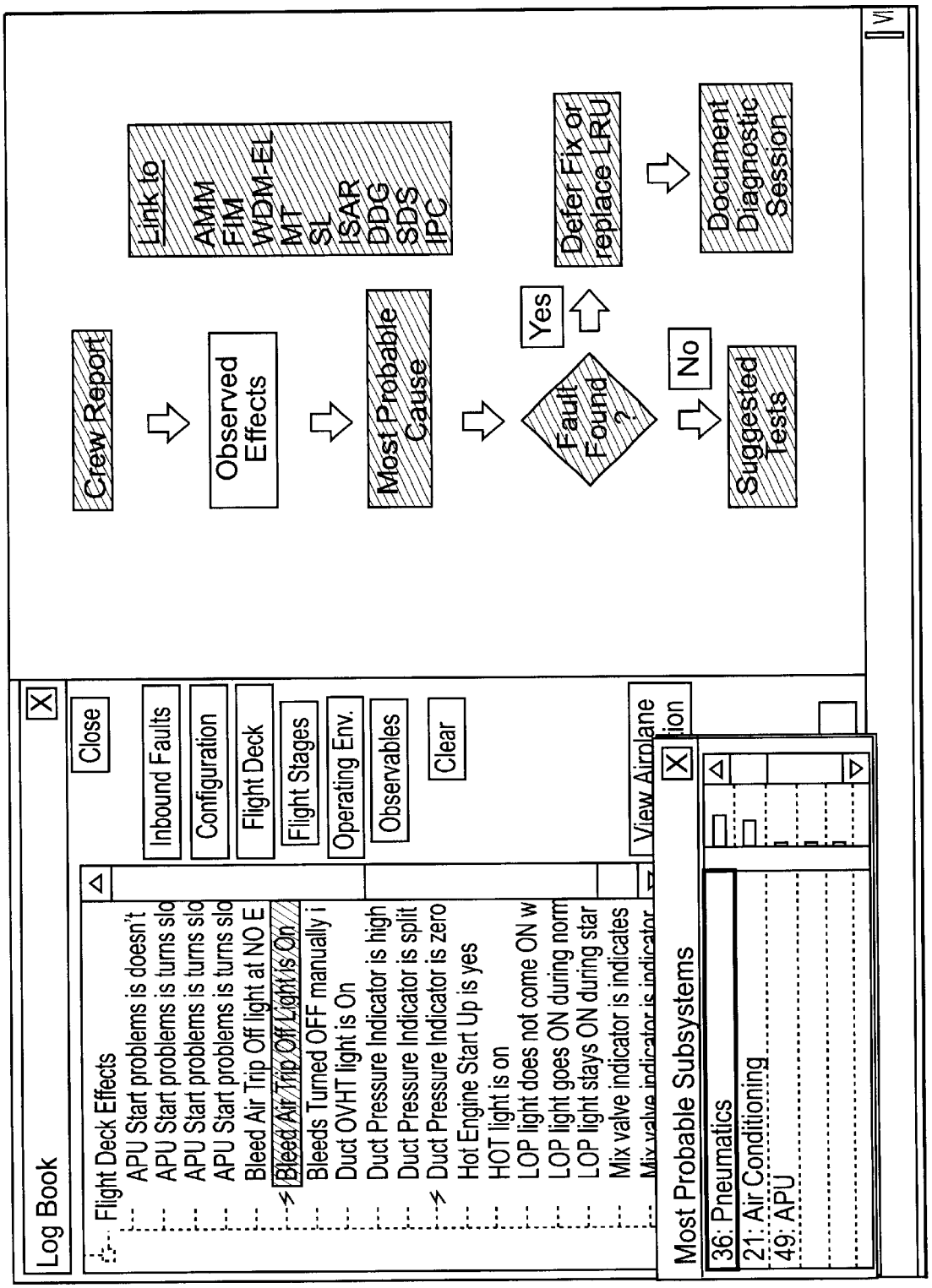
Figure 5P:
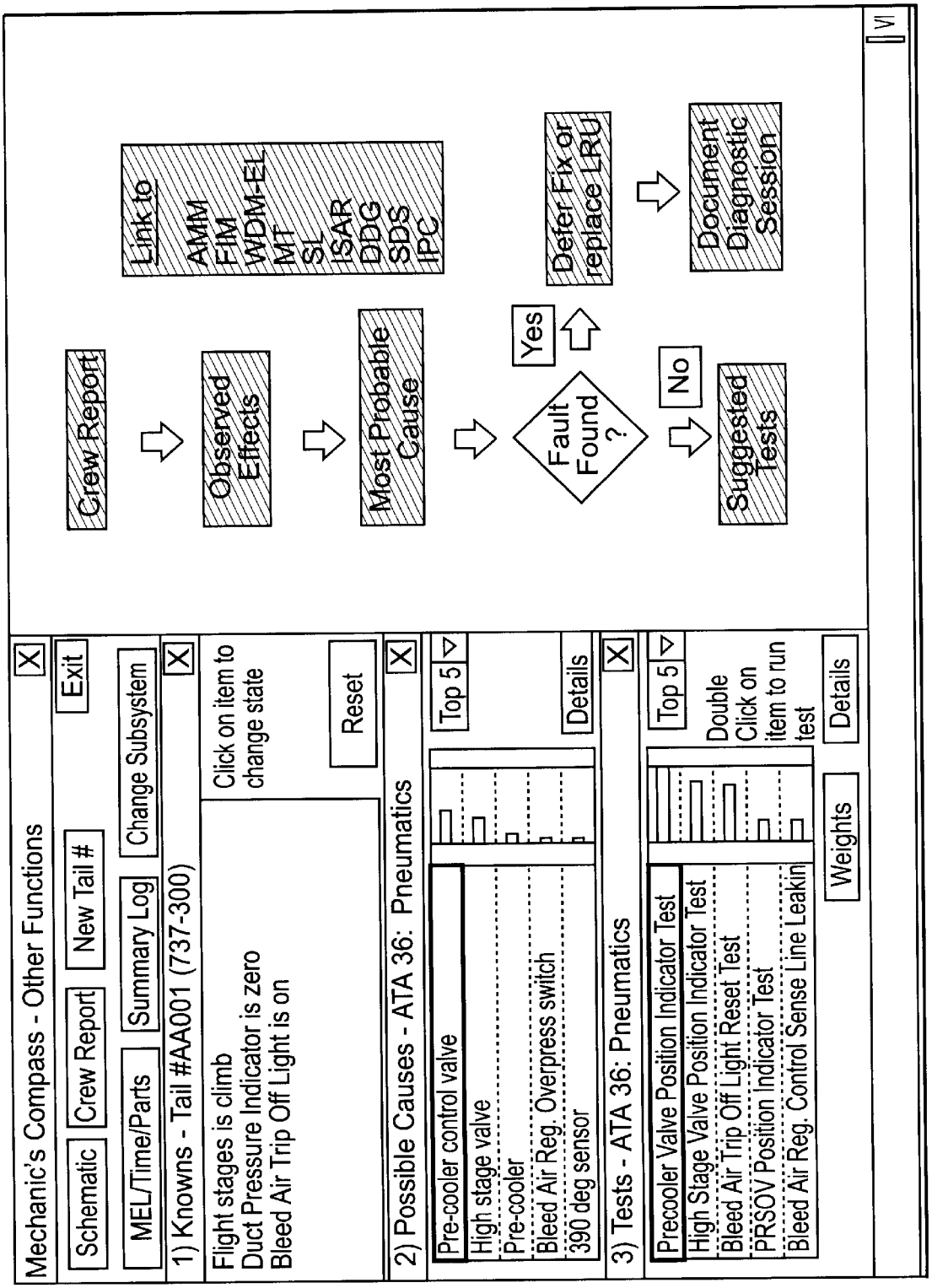
Figure 5R:
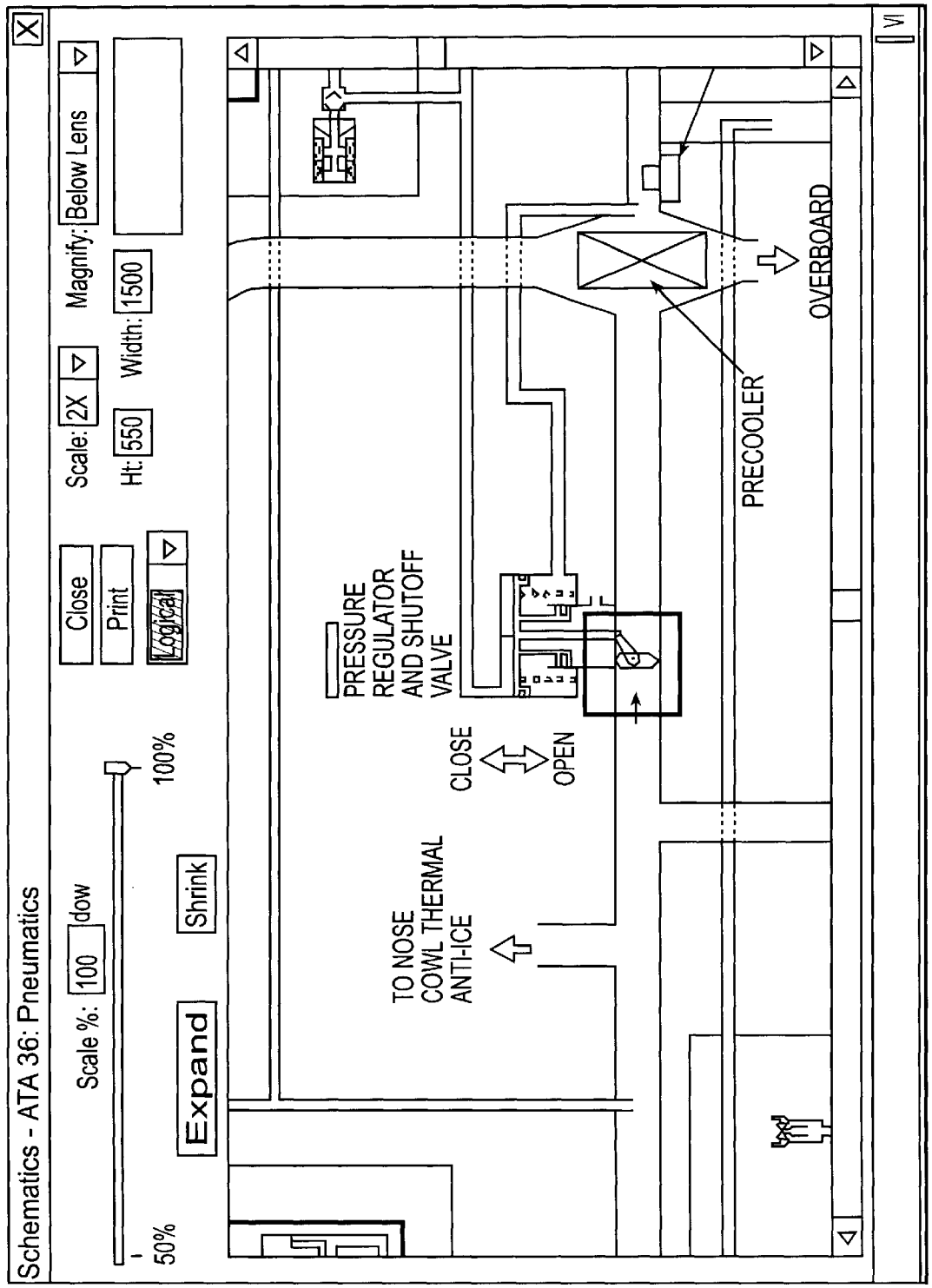
Figure 5S:
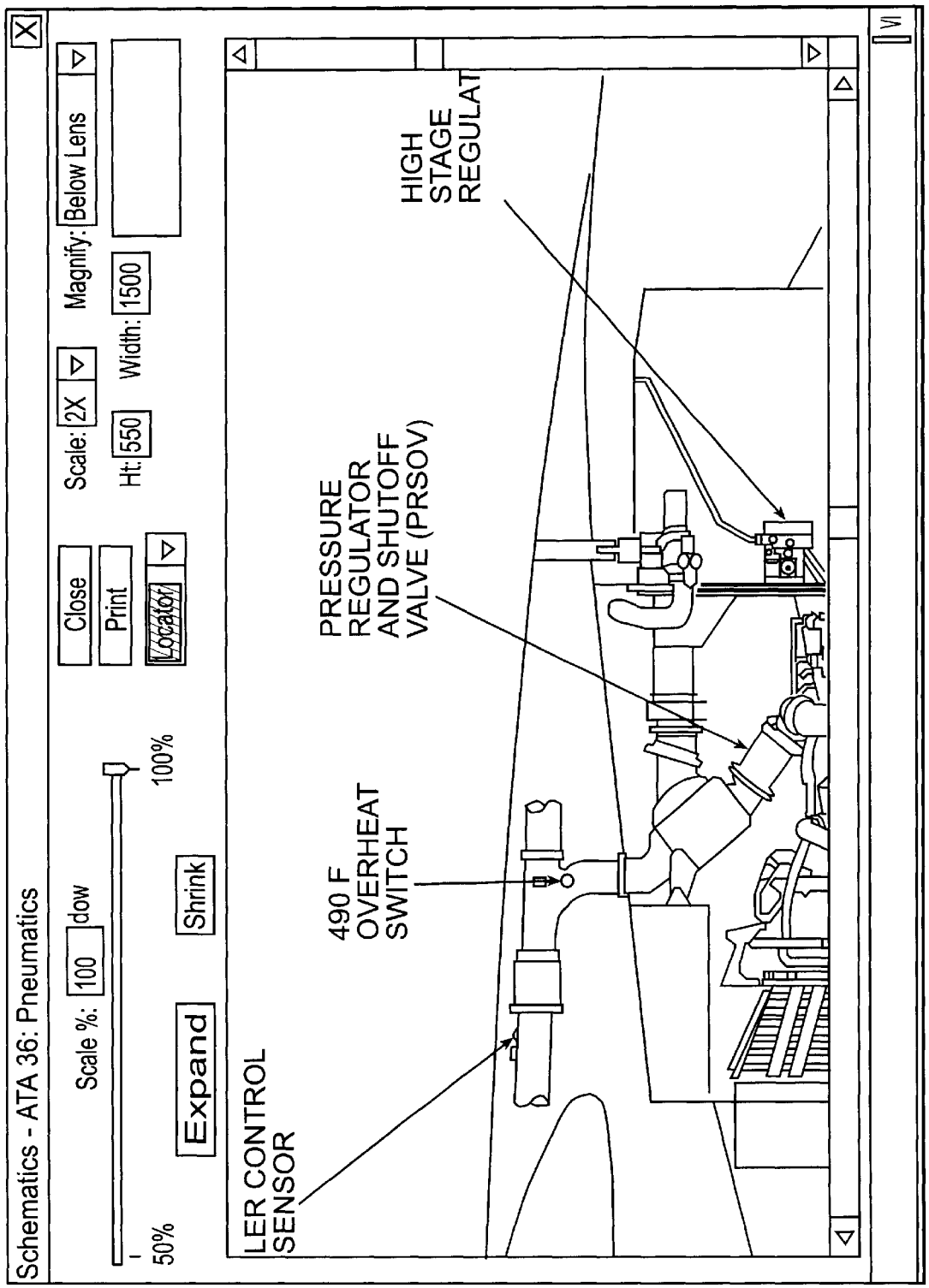
Figure 6:
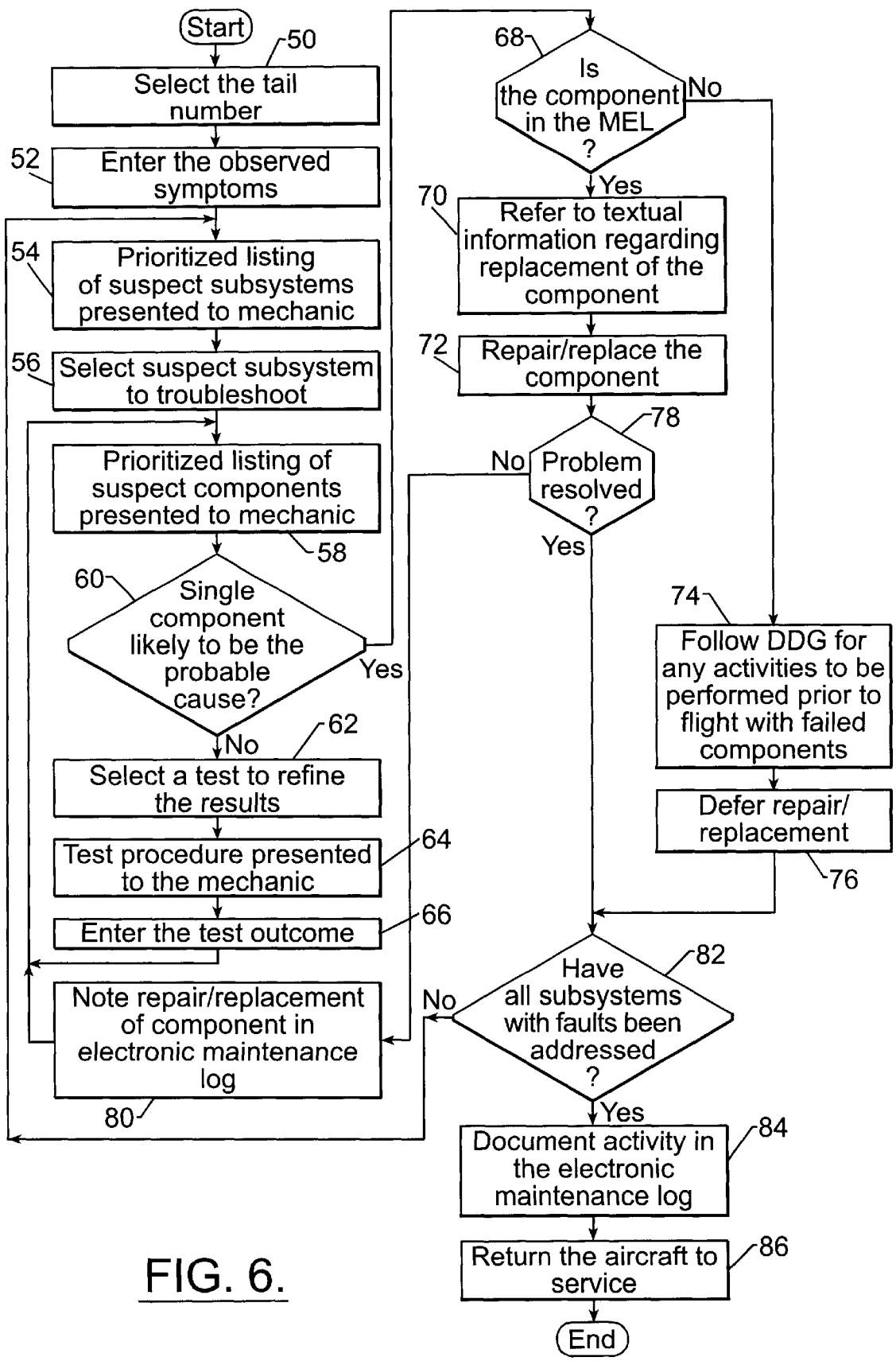

Having thus described the invention in general terms, reference will now be made to the accompanying drawings, which are not necessarily drawn to scale, and wherein:

FIG. 1 is an environmental view depicting an aircraft mechanic utilizing a diagnostic system and method according to one embodiment of the present invention;

FIG. 2 is a block diagram of a diagnostic system and method according to one embodiment of the present invention;

FIG. 3 is a network fragment of a Bayesian network for the air conditioning subsystem constructed from systemic information;

FIG. 4 is a network fragment of a Bayesian network for the auxiliary power unit constructed from experiential information;

FIGS. 5A–5S are a series of screen displays presented by the diagnostic system and method according to one embodiment of the present invention; and FIG. 6 is a flowchart illustrating the operations performed by the diagnostic system and method according to one embodiment of the present invention.

DETAILED DESCRIPTION OF THE PREFERRED EMBODIMENT

The present invention now will be described more fully hereinafter with reference to the accompanying drawings, in which preferred embodiments of the invention are shown. This invention may, however, take many different forms and should not be construed as limited to the embodiments set forth herein; rather, these embodiments are provided so that this disclosure will be thorough and complete, and will fully convey the scope of the invention to those skilled in the art.

According to the present invention, an improved diagnostic system and method are provided. Since the diagnostic system and method are particularly useful for the aircraft industry, the diagnostic system and method will be hereinafter described and illustrated in conjunction with the troubleshooting of an aircraft. However, the diagnostic system and method can be used to troubleshoot any system having a number of interconnected components, such as the complex systems created by the automotive, marine, electronics, power generation and computer industries.

Referring to FIG. 1, a mechanic who has been tasked to troubleshoot a problem identified with an aircraft is shown to be utilizing a diagnostic system and method of one embodiment of the present invention in order to perform the troubleshooting process in an efficient and reliable manner. While the diagnostic system and method are particularly advantageous for the more time-sensitive unscheduled maintenance operations on models of aircraft that do not have onboard diagnostic systems as will be apparent in light of the following description, the diagnostic system and method is also useful for other maintenance operations, including scheduled maintenance. Further, the diagnostic system and method of the present invention are equally applicable to on-board troubleshooting with data from the aircraft central maintenance serving as input to the diagnostic system and method. Additionally, while the diagnostic system and method are particularly useful for a mechanic, the diagnostic system and method can be used by others including shop personnel or engineers involved in the troubleshooting process and maintenance operation control managers.

Generally the diagnostic system and method is embodied in a computing device 10 that the mechanic can preferably carry to the aircraft. In embodiments in which the portable computing device will support the diagnostic system and method as a stand alone application without having to be networked, the portable computing device is preferably a personal computer (PC), such as a laptop PC or some other specialized type of PC. While not portable, a desktop PC could also serve as a stand alone computing device. Alternatively, the portable computing device may be designed to support the diagnostic system and method in a networked environment in which at least a portion of the diagnostic system and method is supported by a server or other network device. In this instance, the remote computing device can be a miniature computer such as a pocket PC, a personal data assistant (PDA) such as a Palm device, or some other type of hand held computer. With the rapid advances in computing technology, however, these miniature computers may soon be capable of supporting the diagnostic system and method in a stand alone manner and additional computing devices may be developed that are also capable of supporting the diagnostic system and method. Thus, the diagnostic system and method of the present invention are not limited by the type of computing device which serves as the host.

As shown in FIGS. 1 and 2, the diagnostic system includes an interface 12 for receiving input from the mechanic. The diagnostic system can include any interface known to those skilled in the art including a keyboard, a mouse, a track ball, a touch screen or the like. The diagnostic system also includes a display 14, such as a graphical user interface, for presenting information to the mechanic. The display is preferably full sized and offers high resolution, although the display can have other sizes and lower resolutions in order to reduce the cost of the diagnostic system and method and/or to increase the portability of the diagnostic system and method. Examples of the interface and display are provided below for purpose of illustration. However, the diagnostic system can include other interfaces and displays and, in one embodiment, may include content delivered via the Internet. The diagnostic system further includes a processing element 16 for performing the various operations required by the diagnostic technique of the present invention. The processing element is typically comprised of a combination of hardware, such as one or more microprocessors or other processing devices, and software that is stored by memory and executed by the hardware to implement the diagnostic model described herein. However, the processing element can be comprised of other combinations of hardware, software, firmware or the like so long as the resulting combination is capable of implementing the diagnostic model described below. The diagnostic system therefore also includes memory including internal read only memory (ROM) and random access memory (RAM) as well as an associated CD ROM, an optical disk or the like for providing additional storage including storage of the databases that will be subsequently described. To facilitate the portability of the computing device, the computing device also preferably includes a battery for providing power to the processing element and other components of the computing device.

The diagnostic system and method of the present invention is designed to receive input relating to various observed symptoms that indicate a problem onboard the aircraft that is generally caused by a failed component, such as a failed LRU or a lower level component within an LRU. The relationship between the observed symptoms and the failed component is often far from clear to the mechanic. However, the diagnostic system and method of the present invention assists the mechanic in troubleshooting the problem and identifying the failed components based upon the observed symptoms and, perhaps, the results of additional tests. The input relating to the observed system is generally received via the interface 12. Typically, the observed symptoms are provided by the flight and cabin crew and are recorded in pilot log books, crew reports or the like. These observed symptoms can come in many forms including flight deck effects and other observations. Flight deck effects include indications provided by various gauges, indicator lights and the like, examples of which will be provided hereinbelow. The observations can include various types of environmental or other information including suspect sounds, vibrations, smells or visual cues observed by the flight, cabin or maintenance crew. Further, the observed symptoms can include the results of tests and/or information provided by various computers, sensors or other equipment onboard the aircraft.

The processing element 16 of the diagnostic system embodies a first processing portion for correlating the input relating to the observed symptoms with one or more suspect components. Each suspect component is capable of having caused the observed symptoms if the respective suspect component failed. The processing element could not only identify a number of suspect components, but it could also prioritize the suspect components based upon the likelihood that they caused the symptoms. The processing element can also include a second processing portion for identifying the test(s) to be performed in order to refine the identity and priority of the suspect components. After performing one or more of the tests and entering the results of the test(s) via the interface 12, the processing element will revise the likelihood associated with the suspect components. To assist the mechanic, the processing element can also prioritize the tests, preferably based upon such criteria as the time required to conduct the test or the value of the information to be obtained from the test.

The processing element correlates the observed symptoms with one or more suspect components according to a diagnostic model. The diagnostic model is preferably constructed based upon systemic information, experiential information as well as factual information. The systemic information is typically related to the system components and the input-output relations of the system components. The systemic information may be obtained in various manners, but is typically gathered through interviews with system engineers or the like for the aircraft manufacturer who have significant experience in the design and development of the aircraft and its attendant systems and the relationship of the various subsystems. The experiential information defines the direct relationships between component failures and the observed symptoms. While the experiential information can also come from various sources, the experiential information is typically provided by experienced mechanics or engineers who have extensive experience troubleshooting a particular model of aircraft and have a wealth of information relating to the typical types of failures and the symptoms exhibited by an aircraft having each type of failure, including those particularly troubling faults that are multiple, intermittent, repeating or cross-system in nature. As such, the experiential information includes the tricks of the trade and the unwritten rules only known to the more experienced mechanics. Finally, the factual information relates to component reliability. Typically, the factual information is statistical data of component reliability as well as related textual data from historical maintenance records. As such, the factual information provides the statistical data necessary to determine the probability of each failure state of each component, such as each LRU, of an aircraft.

Based upon these various types of information, a number of different diagnostic models or networks can be constructed to correlate the observed symptoms with one or more suspect components. For example, the diagnostic model can be constructed utilizing model-based or case-based reasoning, bayesian networks, neural networks, fuzzy logic, expert systems or the like. Since bayesian networks can accept reliability data as well as information from other sources, such as systemic information and experiential information, and can compute posterior probabilities for prioritizing the suspect components, the diagnostic model of one advantageous embodiment is constructed based upon a bayesian network that is capable of being updated. See, for example, S. L. Lauritzen et al., *Local Computations With Probabilities on Graphical Structures and Their Applications to Expert Systems,* Journal of the Royal Statistical Society B, Vol. 50, pp. 157–224 (1988) for a more detailed discussion of the bayesian probability update algorithm. A number of software packages are commercially available for building models of a bayesian network. These commercially available software packages include Dxpress from Knowledge Industries Inc., Netica from Norsys Software Corporation of Vancouver, British Columbia, and Hugin from Hugin Expert A/S of Denmark. As provided by these commercially available software packages, the processing element preferably includes a software package which includes noisy max equations for building the bayesian network that will form the diagnostic model.

Regardless of the model building tool that is used, the general approach to constructing a bayesian network for airplane diagnosis is to map the causes of failure to the observed symptoms, as opposed to the normal behavior of the system. While any model building approach known to those skilled in the art can be used, several model building approaches for bayesian networks are described by M. Henrion, *Practical Issues in Constructing a Bayes' Belief Network,* Uncertainty in Artificial Intelligence, Vol. 3, pp. 132–139 (1988), and H. Wang et al., *User Interface Tools for Navigation in Conditional Probability Tables and Graphical Elicitation of Probabilities in Bayesian Networks,* Proceedings of the Sixteenth Annual Conference on Uncertainty and Artificial Intelligence (2000).

The construction of a bayesian network requires the creation of nodes with collectively exhaustive, mutually exclusive discrete states, and influence arcs connecting the nodes in instances in which a relationship exists between the nodes, such as in instances in which the state of a first node, i.e., the parent node, effects the state of a second node, i.e., the child node. In a bayesian network, a probability is associated with each state of a child node, that is, a node that is dependent upon another node. In this regard, the probability of each state of a child node is conditioned upon the respective probability associated with each state of each parent node that relates to the child node.

The nodes of a bayesian network include both probablistic and deterministic nodes representative of the components, observed symptoms and tests. Typically, the nodes representative of the components and the nodes representative of the observed symptoms are interconnected through one or more intermediate nodes via influence arcs. For example, a network fragment constructed based upon systemic information for the air conditioning system for the 737-300/400/500 aircraft is shown in FIG. 3. The network fragment include nodes for the air conditioning system components, including the primary and secondary heat exchangers, the air-cycle-machine (ACM), the control cabin, turbine and compressor switches, the pack valve and the relay. Component nodes have no predecessors or parents influencing them. The network fragment also includes nodes for the observed symptoms, such as the illumination of the pack-trip-off-light, and for tests to be conducted to refine the results of the diagnostic model. Test and observation nodes have no successors or children to influence. The network fragment also includes a number of intermediate nodes interconnecting the nodes for the components and the nodes for the observed symptoms. The intermediate nodes represent the failure state of a switch, valve, duct or the like. Based upon the failure state of a component, the intermediate nodes may interconnect the node(s) representing one or more components with the node(s) representing one or more of the observed symptoms in an acyclic manner. Bayesian networks cannot function if a feedback loop (cycle) exists. Therefore, influence arcs can never be bidirectional. They can only flow in one direction.

By way of example, and as the network fragment illustrates, there is a direct correspondence between the structure of the air conditioning system and the casual relationship reflected by the bayesian network. For example, the air supply that reaches the ACM, comprised of a compressor and a turbine mounted upon the same shaft, flows initially through the primary heat exchanger before reaching the compressor in the ACM. The condition of the primary heat exchanger affects the compressor outlet temperature by its ability to cool the flow of air through it. The cooling flow is, therefore, directly dependent upon the health condition of the primary heat exchanger, as indicated by arc 20. The compressor outlet temperature directly affects the state of the compressor switch, as indicated by arc 22, which changes to the "closed" position when the temperature exceeds 390° F. The closing of the compressor switch causes the overheating relay to de-energize which, in turn, causes the pack valve to change its closed position and to turn the pack-trip-off-light on, as indicated by arcs 24. As represented by the bayesian network, therefore, the health condition of the primary heat exchanger LRU mediated through several intermediate nodes, i.e., the primary heat exchanger cooling flow, the compressor outlet temperature, the compressor switch state, the switch closed node and the relay state node, can cause the pack valve to close and the pack-trip-off-light (an observed symptom) to turn on. As the network fragment also indicates, however, other events can also effect the pack-trip-off-light including, for example, the secondary heat exchanger or a failure of the relay. Thus, the observed symptom, turning on the pack-trip-off-light, is symptomatic of the failure of several different components.

By way of further example, FIG. 4 depicts a network fragment of the auxiliary power unit (APU) of a 737 aircraft based upon experiential information. In FIG. 4, the APU explosive bang is an observed symptom and is shown to implicate the combustor-atomizer, the fuel solenoid valve and the entire APU unit, through their corresponding failure modes (FMs). While separate network fragments are depicted that are based upon systemic information and experiential information for purposes of illustration, the bayesian network synthesizes the network fragments constructed from both systemic and experiential information for the same subsystem to construct a single network for each subsystem.

Each node of a network has a list of collectively exhaustive, mutually exclusive states. If the states are normally continuous, they must be discretized before being implemented in the network. For example, every component node has at least two states, (i.e., normal and failed). The other nodes, however, can include states that are defined by some experiential information. For example, the combustor/atomizer failure mode contains six mutually exclusive and exhaustive states, namely, normal, flow divider opening prematurely, air leaks, degraded spray pattern, carbon deposits and corroded combustor. A probability is assigned to each state of each node. The probability is typically based upon the factual information, but may also be partially based upon systemic and/or experiential information. For a node representing a component, the probability that is assigned to the failed state is obtained from the reliability and maintainability data and/or experential data. For example, the combustor/atomizer LRU has a probability of failing of 0.00003 which is derived using appropriate probability models from observed meantime between failures. The other nodes, such as the intermediate nodes, contain conditional probability tables mostly derived from experiential information, with distributions specified over the states of the child nodes conditioned over the states of the parent nodes. For example, the following distribution table for the APU-explosive bang node is conditioned over the states of the combustor/atomizer failure node:

| | Combustor/Atomizer | | | | | |
|---|---|---|---|---|---|---|
| APU Explosive Bang | Normal | Flow divider open prematurely | Air leaks | Degraded spray pattern | Carbon deposits | Corroded combustor |
| None | 1 | 1 | 0.5 | 0.6 | 0.5 | 0.5 |
| Heard | 0 | 0 | 0.5 | 0.4 | 0.5 | 0.5 |

By way of example of the interpretation of the distribution table, given that the combustor/atomizer has a degraded spray pattern, the probability that an APU-explosive bang will be heard at 0.4. As such, by stating that the state of the APU-explosive bang child node is conditioned over the state of the combustor/atomizer parent node, it is meant that the probability assigned to the different states of the APU-explosive bang node, i.e., the bang being heard or no bang, is dependant upon the state of the parent node.

Based upon one or more observed symptoms, a processing element implementing a bayesian network can therefore identify one or more suspect components, such as LRUs or lower level components within an LRU, that may have failed and caused the observed symptom(s). In addition, the processing element implementing the bayesian network can identify the probability that each suspect component failed and caused the observed symptoms based upon the probability of failure of the node representing the suspect component and the probabilities associated with the respective states of the intermediate nodes that lead to the node representing the observed symptom. Accordingly, the processing element can present the suspect components upon the display 14 or a prioritized listing based upon the respective probabilities of failure of the suspect components.

The bayesian network implemented by the processing element can also identify one or more tests that may be conducted in order to refine the identification of the suspect components and the relative probability that each suspect component caused the problem with the aircraft. In this regard, the bayesian network can include nodes representative of tests to be conducted to determine the state of one or more other nodes such that the links between the nodes for the suspect components and the nodes for the observed symptoms can be refined based on the outcome of the test(s). For example, the network fragment of FIG. 3 includes a node representative of a pack trip reset test that would provide information relating to the respective state of the control cabin switch, the turbine switch and the compressor switch, i.e., the parent nodes. Accordingly, the bayesian network implemented by the processing element can identify those tests related to any of the nodes in the path from the suspect components to the observed symptoms or tests that could be conducted to refine the identification and prioritization of the suspect components.

Upon presentation of the list of suspect components and one or more tests that can be performed to refine the identification and prioritization of the suspect components, the mechanic may perform one or more of the tests and enter the results or the outcome of the tests via the interface 12. Results of the tests are then provided to the processing element. The suspect components capable of causing the observed symptoms upon failure and their relative probability of failure are again determined based upon the outcome of the test(s) such that a reprioritized listing of the suspect components can be presented to the mechanic. The mechanic may then begin to repair or replace one or more of the suspect components, decide to defer any repair or replacement or conduct further tests in order to further refine the identification and prioritization of the suspect components.

In addition to providing prioritized listings of the suspect components and the tests that could be performed to reprioritize the listing of suspect components, the diagnostic system and method can also provide the mechanic with additional information in order to facilitate the troubleshooting process. As such, the processing element can link to one or more databases, either within the remote computing device 10 or maintained by a server or other network device with which the computing device is in communication. For example, the diagnostic system can include databases including additional information relating to suspect components, such as a database relating to component availability, and a database 30 containing data relating to the time to repair or replace a suspect component and the costs to repair or replace a suspect component. With respect to component availability, the diagnostic system of FIG. 2 can include a database 32 that maintains a listing of the inventory available to the mechanic such that the mechanic can quickly determine if a suspect component that should be replaced is available. Additionally, the diagnostic system can include a database 34 having the minimum equipment list. As such, the mechanic can quickly determine if the suspect component is not on the minimum equipment list and therefore determine if the repair can be deferred, such as until the completion of the aircraft's flight for the day. As also shown in FIG. 2, the diagnostic system may include a database 36 having schematic images of each of the suspect components. As such, the display 14 of the diagnostic system can present the schematic image of one or more of the suspect components such that the mechanic can quickly assess and repair or replace a suspect component. Among other things, the display is also capable of indicating the relative likelihood that the suspect component has failed concurrent with the schematic image of the suspect component. Further, the diagnostic system can include a database 38 containing textual data describing the suspect component and/or each test. This textual data can include, for example, the relevant sections of the fault isolation manual (FIM) and the aircraft maintenance manual (AMM) as well as other related textual data. Thus, a mechanic considering the replacement of a suspect component can quickly review a wide variety of related information without having to return to their desks to access schematics or other manuals.

Upon completion of a troubleshooting process and any necessary repairs, the diagnostic system and method permit the mechanic to record the actions taken, thereby forming an electronic logbook of the maintenance actions that may also be stored in a database 40. In this regard, the processing element 16 can cause a template to be displayed upon the display 14 which solicits information from the mechanic regarding the observed symptoms, and the suspect components and any tests that were performed. In addition, the display will obtain information regarding actions taken with respect to repair or replacement of one or more of the suspect components and any actions deferred, such as the repair or replacement of one or more suspect components that are not on the minimum equipment list. The information entered by the mechanic is saved and forms a portion of the maintenance logbook for the aircraft. The information entered by the mechanic relating to the suspect components can also facilitate trend analysis for the aircraft. Additionally, any actions deferred can serve to trigger an alarm to alert the mechanic or other mechanics of the need to complete the deferred action within the necessary time frame. Further, the data collected by the diagnostic system and method can be returned to the designers of the diagnostic model such that the respective probabilities and the interrelationships between the various nodes of the diagnostic model can be refined in light of the additional field data.

By way of example, the operation of a diagnostic system and method of one embodiment will be hereinafter described and illustrated by FIGS. 5A–5S and the flowchart of FIG. 6. As shown in FIG. 5A, upon beginning a diagnostic session, the diagnostic system will prompt the mechanic to enter the tail number of the aircraft. Although the mechanic can enter the tail number by typing the tail number into the appropriate space, the mechanic can select one of the listed tail numbers as shown in FIGS. 5B and 5C. See also block 50 of FIG. 6.

Upon beginning the diagnostic procedure, the mechanic initially inputs all of the observed symptoms, most of which are typically obtained from the pilot logbook or the crew report. See block 52 of FIG. 6. To assist the mechanic, the diagnostic system and method can present a list of possible symptoms as shown in FIG. 5D, once the mechanic selects the flight deck effects feature. In this example, the crew report indicated that the duct pressure indicator was zero and the mechanic therefore selects this entry from the listed symptoms. In addition to entering the observed symptoms, which become a part of the inbound faults, the mechanic can also enter other information if available. For example, the mechanic can enter information pertaining to the configuration of the aircraft, such as flaps down. In addition, the mechanic can enter the operating environment of the aircraft, such as operating in extreme cold or on normal paved runways, and the flight stage of the aircraft, such as climb or cruise, at the time of the problem. The mechanic may also use the "observables" section to record new observations associated with the diagnostic session. These new observations then become a part of the documented list from which selections can be made in the future. In addition, it is noted that a flowchart illustrating the overall diagnostic process is depicted on the right side of the display with the current operation being highlighted to assist the mechanic in determining the steps that have been completed and the steps remaining.

Upon entering all of the symptoms and any other information relevant to the diagnostic procedure, the diagnostic model is executed and a number of suspect components are identified, as shown in FIG. 5E. The response provided by the diagnostic system and method following execution of the diagnostic model also indicates the subsystem containing the suspect components, such are the pneumatics subsystem of the illustrated example, as well as the known symptoms and any other information. In this regard, it is noted that the flight stage of the aircraft at the time of the problem is also noted as being a climb. Preferably, the suspect components are presented in a prioritized listing based upon the relative likelihood that the failure of each suspect component caused the observed symptoms. See block 58 of FIG. 6. In this example, only the top five suspect components most likely to have failed and caused the observed symptoms are listed. They are the bleed air regulator, followed by the pre-cooler control valve, the pressure regulator and shut off valve (PRSOV), the high stage valve and the 450° thermostat. An indication, such as the bars to the right of the suspect components, is also preferably provided of the relative probability that the respective suspect component failed and caused the observed symptoms. By placing the cursor over the probability indication, the actual numerical probability value is preferably displayed. Alternatively, all components can be viewed in ranked probability order of causing the observed problem.

Additionally, the diagnostic system and method can provide one or more tests that can be performed in order to refine the identification of the suspect components and their respective prioritization. In this example, the suspect component has a relatively low probability, i.e., less than 75%. As such, it is typically advantageous to conduct one or more tests to increase the probability that the suspect component that is repaired or replaced is actually faulty and caused the problem with the aircraft. See blocks 60 and 62 of FIG. 6. Preferably, the tests are also presented in a prioritized listing based upon a predetermined criteria. Typically, the tests are prioritized based upon the value of the information provided by the test. Typically, the value of the information is based upon the differentiation that each test can provide towards differentiating the suspect component listed first, i.e., the suspect component with the greatest associated probability, from the remainder of the suspect components. In some instances, however, the mechanics may desire to prioritize the tests according to a different predetermined criteria, such as the time required to execute the task with the quickest task being listed first. As shown in FIGS. 5F–5I, the criteria according to which the tests are prioritized can be altered by selecting the weights feature. In the illustrated example, the predetermined criteria can be selected to be any combination of the time required to conduct a test and the value of the information provided by the test results; information that is maintained by another database 42 associated with the tests. If the tests are ranked based entirely upon either the value of the information or the time required to perform the test, the pre-cooler valve position indicator test has the highest priority and is listed first. If the tests are ranked according to a criteria selected based upon equal weighting of both the value of the information and the time required to conduct the tests, the PRSOV position indicator test is given the highest priority, as shown in FIG. 5I.

If a test is conducted, the diagnostic system and method typically displays the test procedure steps and, upon completion of the test, the mechanic enters the outcome of the test via the interface 12. See blocks 64 and 66 of FIG. 6. Typically, the mechanic selects the outcome from a list of appropriate outcomes that are generally displayed in response to the selection of the respective test. Alternatively, the mechanic may enter the outcome in an appropriate field, such as in instances in which the outcome is a numerical value. In the example depicted in FIG. 5J, the test has two possible outcomes, normal or failure, due to being either open or closed. The mechanic therefore enters the outcome of the test by selecting the outcome of the test from the list of possible outcomes. In this example, it will be considered that the outcome of the test was that the valve failed.

The diagnostic system and method will then again determine the suspect components and their respective probabilities based not only upon the observed symptoms, but also upon the outcome of the test. In addition, the diagnostic system and method can identify any additional tests that can be conducted to refine the identification and the prioritization of the suspect components. In this example depicted in FIG. 5K, the PRSOV is now listed as the suspect component with the highest priority and, in fact, the probability associated with the PRSOV having failed and caused the observed symptoms is one. Thus, no additional testing is required and the mechanic can determine the next steps to be taken. In this regard, the mechanic should decide whether to defer maintenance (such as in instances in which the component is not on the minimum equipment list), to fix the component, or to remove or replace the component. See blocks 68–76 of FIG. 6. In instances in which the component is fixed or replaced, the mechanic determines if the problem has been resolved and, if not, repeats the troubleshooting and repair process. See block 78.

Once the mechanic has completed the appropriate maintenance operations, the aircraft is released to flight operations and the mechanic preferably documents the diagnostic session by selecting the summary log feature. See blocks 80, 84 and 86. In this regard, a summary log is displayed as shown in FIG. 5L which indicates the observed symptoms (designated logbook entries) and the test results. In addition, the summary log indicates the suspect component (designated the probable causes) and their respective probability. The summary log also includes spaces for the mechanic to record any actions taken and any actions deferred as shown in FIG. 5M, the mechanic closed and locked valve part No. 3214552 and deferred maintenance to the overnight stop of the aircraft. In order to ensure that the proper part number for the suspect component is entered, the diagnostic system can include a bar code reader 44 for obtaining the bar code associated with the suspect component, if the suspect component includes a bar code. Following its completion, the summary log is saved and forms a portion of the maintenance log of the aircraft. If any actions are deferred, the processing element 16 can note the deferred actions and provide appropriate warnings to subsequently alert the mechanic of the need to perform the deferred action.

While all of the suspect components in the foregoing example were in the pneumatics subsystem, the observed effects may have been caused by suspect components from a number of different subsystems. Typically, separate bayesian networks are developed for each subsystem, although, since some components may be part of two or more subsystems, the bayesian networks for the different subsystems can be interconnected. As such, execution of the diagnostic model causes each bayesian network to be investigated, typically in a parallel manner, to determine which subsystems may be faulty. For example, if an additional observation is added to the initial set of observations from the prior example by selecting the crew reports feature and then selecting an additional symptom, a number of different subsystems may be implicated. In this regard, FIG. 5N indicates the selection of additional observation that the bleed air trip off-light is on. As shown in FIG. 5O, the observed symptoms of a bleed air trip off-light being on and a duct pressure indicator being zero can indicate suspect components in three different subsystems, the pneumatic subsystem, the air conditioning subsystem and the APU subsystem. The diagnostic system and method also preferably provide an indication of the relative probability that the suspect components are in the respective subsystems. The mechanic then selects one of the subsystems, typically the most probable subsystem, for additional analysis. See blocks 54 and 56 of FIG. 6. In this example, the mechanic selects the pneumatic subsystem for further analysis. As shown in FIG. 5P, the diagnostic system and method then determines the suspect components from the selected subsystem as well as tests that can be performed to refine the identification and prioritization of the suspect components. The diagnostic session would then proceed along similar lines to those described above, with the diagnostic process repeating as shown by block 82 until all subsystems that appear to have faults have been addressed. While the methodology of FIG. 6 is depicted by way of an example, the diagnostic system and method can be used in other manners without departing from the spirit and scope of the present invention.

The mechanic may also wish to review additional information related to the suspect components, the possible tests to be conducted or other relevant information in order to facilitate the troubleshooting process. By way of example, the mechanic may desire to seek further information relating to the bleed air regulator, one of the suspect components. As such, the mechanic selects the details feature and the diagnostic system and method accesses the database 38 that includes textual data relating to the bleed air regulator as shown in FIG. 5Q. The textual data in this example includes a link to the appropriate section in the AMM such that the mechanic can also link to this section of the AMM. As indicated in the listing in the flowchart on the right side of the display, the diagnostic system and method can also link to other textual databases including the fault isolation manual (FIM), the wiring diagram manual (WDM), the equipment list (EL), the maintenance tips (MT), the service letters (SL), the in service activity report (ISAR), the dispatch deviation guide (DDG), the service description section (SDS) and/or the aircraft illustrated parts catalog (AIPC). As another example, the mechanic may desire to view a schematic of one or more of the suspect components. In this example, the mechanic selects the schematic feature to view a schematic of the PRSOV, the suspect component with the highest priority. The diagnostic system and method then links to a database 36 containing the schematic images of the suspect components and displays the selected schematic image. As shown in FIG. 5R, the respective suspect component, i.e., the PRSOV, is depicted in the box within the schematic image. In addition, an indication of the relative probability that the illustrated component failed and caused the observer symptoms, i.e., the horizontal bar, is also provided for reference by the mechanic. For a less experienced mechanic, a location diagram may also be useful as illustrated in FIG. 5S. The diagnostic system and method can also link to the MEL by selecting the MEL feature to access the MEL database 34. In addition, the diagnostic system and method can link to a database 32 containing a listing of the inventory and a database 30 containing a listing of the time required to repair each component, either in terms of absolute time or relative time.

By utilizing the diagnostic system and method of the present invention, a mechanic can reliably troubleshoot the complex interconnected systems of an aircraft in an efficient manner. In this regard, the diagnostic model incorporated within the diagnostic system and method includes extensive systemic and experiential information as well as factual information such that the resulting diagnosis is reliable, thereby reducing the number of components that are replaced that are actually functioning properly and reducing the instances in which the troubleshooting process must be delayed in order to contact a representative of the aircraft manufacturer for assistance. In addition, the diagnostic system and method includes techniques for refining the diagnosis and for indicating the relative probability that different ones of the suspect components caused the observed symptoms. By automating the relatively complex diagnostic procedure, the time required to troubleshoot a problem is substantially diminished, thereby permitting a decision to be made regarding repair of a suspect component or the deferral of any maintenance actions to be made in a fairly quick manner. As a result, the diagnostic system and method should reduce the number of flights that are delayed or cancelled for unscheduled maintenance. In addition, the diagnostic system and method facilitates the review of a wide variety of additional information by the mechanic while the mechanic is at the aircraft. Further, the diagnostic system and method maintains all of the information that is collected regarding maintenance operations for a maintenance logbook as well as for further refinement of the diagnostic model.

Although the diagnostic system and method has been described and illustrated in conjunction with the troubleshooting of an aircraft, the diagnostic system and method can be used to troubleshoot any system having a number of interconnected components, such as the complex systems created by the automotive, marine, electronics, power generation and computer industries. As such, the foregoing description of the utilization of the diagnostic system and method in the aircraft industry was for purposes of illustration and example and not of limitation since the diagnostic procedure described above is equally applicable in many different industries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A diagnostic system for identifying a component that has failed, the diagnostic system comprising:
    an interface for receiving input relating to observed symptoms indicative of a failed component;
    a processing element for correlating the input relating to the observed symptoms with a plurality of suspect components that are each capable of causing the observed symptoms upon failure, said processing element capable of prioritizing the plurality of suspect components based upon a relative likelihood that the respective suspect components caused the observed symptoms, said processing element also capable of identifying a plurality of tests to be performed in order to refine the prioritization of the plurality of suspect components, said processing element further capable of prioritizing the plurality of tests based upon at least one predetermined criteria; and
    a display for presenting a prioritized listing of the plurality of suspect components and an indication of at least one of the tests to be performed in order to refine the prioritization of the plurality of suspect components, wherein said interface is capable of receiving input to define the at least one predetermined criteria according to which the plurality of tests are prioritized.

2. A diagnostic system according to claim 1 further comprising at least one database containing data related to at least one of the plurality of suspect components, the at least one test to be performed and the correlation between the observed symptoms and the plurality of suspect components.

3. A diagnostic system according to claim 1 wherein said interface is capable of receiving input relating to an outcome of a test, and wherein said processing element is further capable of reprioritizing the plurality of suspect components based upon the outcome of the test and the relative likelihood that the respective suspect components caused the observed symptoms.

4. A diagnostic system according to claim 1 wherein said processing element is further capable of determining a plurality of suspect subsystems that contain components capable of causing the observed symptoms upon failure, wherein said display is capable of listing the plurality of suspect subsystems, and wherein said interface is capable of receiving input indicative of the respective suspect subsystem to be further analyzed.

5. A diagnostic system according to claim 1 wherein said interface is capable of receiving data relating to remedial actions undertaken with respect at least one suspect component.

6. A diagnostic system according to claim 1 wherein said processing element correlates the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability.

7. A diagnostic system according to claim 6 wherein said processing element correlates the input relating to the observed symptoms with the at least one suspect component in accordance with the diagnostic model comprising a plurality of nodes and a plurality of arcs that interconnect the nodes in a manner defined by the systemic information and the experiential information, wherein the plurality of nodes include nodes representing the components and the observed symptoms, wherein each node has at least two states, and wherein the diagnostic model assigns a probability to each state of a node based upon at least one of the systemic information, the experiential information and the factual information.

8. A method for identifying a component that has failed, the method comprising:

receiving input relating to observed symptoms indicative of a failed component;

correlating the input relating to the observed symptoms with a plurality of suspect components that are each capable of causing the observed symptoms upon failure;

prioritizing the plurality of suspect components based upon a relative likelihood that the respective suspect components caused the observed symptoms;

identifying a plurality of tests to be performed in order to refine the prioritization of the plurality of suspect components;

receiving input to define at least one predetermined criteria relating to the plurality of tests;

prioritizing the plurality of tests based upon the at least one predetermined criteria; and displaying a prioritized listing of the plurality of suspect components and an indication of at least one of the tests to be performed in order to refine the prioritization of the plurality of suspect components.

9. A method according to claim 8 further comprising:

receiving input to redefine the at least one predetermined criteria; and reprioritizing the plurality of tests based upon the redefined criteria.

10. A method according to claim 8 further comprising displaying data related to at least one of the plurality of suspect components, the at least one test to be performed and the correlation between the observed symptoms and the plurality of suspect components.

11. A method according to claim 8 further comprising:

receiving input relating to an outcome of a test; and reprioritizing the plurality of suspect components based upon a relative likelihood that the respective suspect components caused the observed symptoms in light of the outcome of the test.

12. A method according to claim 8 further comprising:

determining a plurality of suspect subsystems that contain components capable of causing the observed symptoms upon failure;

listing the plurality of suspect subsystems; and receiving input indicative of the respective suspect subsystem to be further analyzed while correlating the input relating to the observed symptoms with the plurality of suspect components.

13. A method according to claim 8 further comprising:

receiving data relating to remedial actions undertaken with respect at least one suspect component; and creating a summary log of the observed symptoms, the at least one suspect component and the remedial actions.

14. A method according to claim 8 wherein correlating the input relating to the observed symptoms with the at least one suspect component comprises correlating the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability.

15. A processing element for identifying a component that has failed, the processing element comprising:

a first processing portion for correlating input relating to at least one observed symptom with a plurality of suspect components that are each capable of causing the at least one observed symptom upon failure, said first processing portion capable of prioritizing the plurality of suspect components based upon a relative likelihood that the respective suspect components caused the at least one observed symptom; and a second processing portion for identifying a plurality of tests to be performed in order to refine the prioritization of the plurality of suspect components, said second processing portion capable of prioritizing the plurality of tests based upon at least one predetermined criteria, said second processing portion further capable of driving a display of the plurality of prioritized tests.

16. A processing element according to claim 15 wherein said second processing portion is further capable of reprioritizing the plurality of tests based upon a redefinition of the at least one predetermined criteria.

17. A processing element according to claim 15 wherein said first processing portion is further capable of reprioritizing the plurality of suspect components based upon the outcome of a test and the relative likelihood that the respective suspect components caused the observed symptoms.

18. A processing element according to claim 15 further comprising a third processing portion for determining a plurality of suspect subsystems that contain components capable of causing the observed symptoms upon failure.

19. A processing element according to claim 15 wherein said first processing portion correlates the input relating to the observed symptoms with the plurality of suspect components in accordance with a diagnostic model constructed based upon systemic information relating to the components and input-output relationships of the components, experiential information relating to direct relationships between component failures and the observed symptoms, and factual information relating to component reliability.

20. A processing element according to claim 19 wherein said first processing portion correlates the input relating to the observed symptoms with the plurality of suspect components in accordance with the diagnostic model comprising a plurality of nodes and a plurality of arcs that interconnect the nodes in a manner defined by the systemic information and the experiential information, wherein the plurality of nodes include nodes representing the components and the observed symptoms, wherein each node has at least one state, and wherein the diagnostic model assigns a probability to each state of a node based upon at least one of the systemic information, the experiential information and the factual information.

21. A method for identifying a component that has failed, the method comprising:
correlating input relating to at least one observed symptom with a plurality of suspect components that are each capable of causing the at least one observed symptom upon failure;
prioritizing the plurality of suspect components based upon a relative likelihood that the respective suspect components caused the at least one observed symptom;
identifying a plurality of tests to be performed in order to refine the prioritization of the plurality of suspect components;
prioritizing the plurality of tests based upon at least one predetermined criteria; and
displaying the plurality of prioritized tests.

22. A method according to claim 21 further comprising:
altering the at least one predetermined criteria; and
reprioritizing the plurality of tests based upon the altered criteria.

23. A method according to claim 21 further comprising:
receiving input representative of an outcome of a test; and
reprioritizing the plurality of suspect components based upon the outcome of the test and the relative likelihood that the respective suspect components caused the observed symptoms.

24. A method according to claim 21 further comprising:
determining a plurality of suspect subsystems that contain components capable of causing the observed symptoms upon failure; and
receiving input identifying at least one of the suspect subsystems for further analysis,
wherein the correlation comprises correlating input relating to at least one observed symptom with a plurality of components of the at least one suspect subsystems that has been identified.

25. A method according to claim 21 further comprising:
receiving data relating to remedial actions undertaken with respect at least one suspect component; and
creating a summary log of the observed symptoms, the at least one suspect component and the remedial actions.

26. A method according to claim 21 wherein correlating the input relating to the observed symptoms with the plurality of suspect components comprises correlating the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability.

27. A diagnostic system for identifying a component that has failed, the diagnostic system comprising:
an interface for receiving input relating to observed symptoms indicative of a failed component;
a processing element for correlating the input relating to the observed symptoms with at least one suspect component that is capable of causing the observed symptoms upon failure, said processing element also capable of identifying additional information relating to the at least one suspect component and including at least one item selected from the group consisting of component availability, time to repair the suspect component, cost to repair the suspect component, time to replace the suspect component and cost to replace the suspect component; and
a display for presenting the at least one suspect component and the additional information relating to the at least one suspect component.

28. A diagnostic system according to claim 27 wherein said processing element is capable of prioritizing the at least one suspect component based upon the relative likelihood that the respective suspect component caused the observed symptoms.

29. A diagnostic system according to claim 28 wherein said processing element is also capable of identifying a plurality of tests to be performed in order to refine the prioritization of the at least one suspect component.

30. A diagnostic system according to claim 29 wherein said processing element is further capable of prioritizing the plurality of tests based upon at least one predetermined criteria.

31. A diagnostic system according to claim 30 wherein said interface is capable of receiving input to redefine the at least one predetermined criteria according to which the plurality of tests are prioritized.

32. A diagnostic system according to claim 29 wherein said interface is capable of receiving input relating to an outcome of a test, and wherein said processing element is further capable of reprioritizing the at least one suspect component based upon the outcome of the test and the relative likelihood that the respective suspect components caused the observed symptoms.

33. A diagnostic system according to claim 27 further comprising at least one database containing the additional information.

34. A diagnostic system according to claim 33 wherein said at least one database comprises schematic images of the plurality of suspect components, and wherein said display is capable of presenting the schematic image of a suspect component.

35. A diagnostic system according to claim 34 wherein said display is further capable of indicating the relative likelihood that the suspect component for which a schematic image is presented has failed.

36. A diagnostic system according to claim 33 wherein said at least one database comprises a minimum equipment list, and wherein said display is capable of indicating the respective suspect components that are on the minimum equipment list.

37. A diagnostic system according to claim 33 wherein said at least one database comprises an inventory of components, and wherein said display is capable of indicating the respective suspect components that are in inventory.

38. A diagnostic system according to claim 33 wherein said at least one database comprises textual data describing each suspect component, and wherein said display is capable of presenting the textual data.

39. A diagnostic system according to claim 27 wherein said processing element correlates the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability.

40. A diagnostic system according to claim 39 wherein said processing element correlates the input relating to the observed symptoms with the at least one suspect component in accordance with the diagnostic model comprising a plurality of nodes and a plurality of arcs that interconnect the nodes in a manner defined by the systemic information and the experiential information, wherein the plurality of nodes include nodes representing the components and the observed symptoms, wherein each node has at least two states, and wherein the diagnostic model assigns a probability to each state of a node based upon at least one of the systemic information, the experiential information and the factual information.

41. A method for identifying a component that has failed, the method comprising:
    receiving input relating to observed symptoms indicative of a failed component;
    correlating the input relating to the observed symptoms with at least one suspect component that is capable of causing the observed symptoms upon failure;
    identifying additional information relating to the at least one suspect component including at least one item selected from the group consisting of component availability, time to repair the suspect component, cost to repair the suspect component, time to replace the suspect component and cost to replace the suspect component; and
    displaying the at least one suspect component and the additional information relating to the at least one suspect component.

42. A method according to claim 41 further comprising prioritizing the at least one suspect component based upon the relative likelihood that the respective suspect component caused the observed symptoms.

43. A method according to claim 42 further comprising identifying a plurality of tests to be performed in order to refine the prioritization of the plurality of suspect components.

44. A method according to claim 43 further comprising prioritizing the plurality of tests based upon at least one predetermined criteria.

45. A method according to claim 44 further comprising receiving input to redefine the at least one predetermined criteria according to which the plurality of tests are prioritized.

46. A method according to claim 43 further comprising:
    receiving input relating to an outcome of a test; and
    reprioritizing the at least one suspect component based upon the outcome of the test and the relative likelihood that the respective suspect components caused the observed symptoms.

47. A method according to claim 41 wherein identifying additional information comprises identifying schematic images of the plurality of suspect components, and wherein displaying the at least one suspect component and the additional information comprises presenting the schematic image of a suspect component.

48. A method according to claim 47 presenting the schematic image of a suspect component comprises indicating the relative likelihood that the suspect component has failed.

49. A method according to claim 41 wherein identifying additional information comprises identifying a minimum equipment list, and wherein displaying the at least one suspect component and the additional information comprises indicating the respective suspect components that are on the minimum equipment list.

50. A method according to claim 41 wherein identifying additional information comprises identifying an inventory of components, and wherein displaying the at least one suspect component and the additional information comprises indicating the respective suspect components that are in inventory.

51. A method according to claim 41 wherein identifying additional information comprises identifying textual data describing each suspect component, and wherein displaying the at least one suspect component and the additional information comprises presenting the textual data.

52. A method according to claim 41 wherein the correlation comprises correlating the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability.

53. A diagnostic system for identifying a component that has failed, the diagnostic system comprising:
    an interface for receiving input relating to observed symptoms indicative of a failed component;
    a processing element for correlating the input relating to the observed symptoms with at least one suspect components that is capable of causing the observed symptoms upon failure, said processing element correlating the input relating to the observed symptoms with the at least one suspect component in accordance with a diagnostic model constructed based upon systemic information relating to the components and input-output relationships of the components, experiential information relating to direct relationships between component failures and the observed symptoms, and factual information relating to component reliability; and
    a display for presenting the at least one suspect component.

54. A diagnostic system according to claim 53 wherein said processing element correlates the input relating to the observed symptoms with the at least one suspect component in accordance with the diagnostic model comprising a plurality of nodes and a plurality of arcs that interconnect the nodes in a manner defined by the systemic information and the experiential information, wherein the plurality of nodes include nodes representing the components and the observed symptoms, wherein each node has at least two states, and wherein the diagnostic model assigns a probability to each state of a node based upon at least one of the systemic information, the experiential information and the factual information.

55. A diagnostic system according to claim 53 wherein said processing element is capable of prioritizing the at least one suspect component based upon the relative likelihood that the respective suspect component caused the observed symptoms.

56. A diagnostic system according to claim 55 wherein said processing element is also capable of identifying a plurality of tests to be performed in order to refine the prioritization of the at least one suspect component.

57. A diagnostic system according to claim 56 wherein said processing element is further capable of prioritizing the plurality of tests based upon at least one predetermined criteria.

58. A diagnostic system according to claim 57 wherein said interface is capable of receiving input to redefine the at least one predetermined criteria according to which the plurality of tests are prioritized.

59. A diagnostic system according to claim 56 wherein said interface is capable of receiving input relating to an outcome of a test, and wherein said processing element is further capable of reprioritizing the at least one suspect component based upon the outcome of the test and the relative likelihood that the respective suspect components caused the observed symptoms.

60. A diagnostic system according to claim 56 further comprising at least one database containing data related to the at least one suspect component, the plurality of tests to be performed and the correlation between the observed symptoms and the at least one suspect component.

61. A diagnostic system according to claim 53 wherein said processing element is further capable of determining a plurality of suspect subsystems that contain components capable of causing the observed symptoms upon failure, wherein said display is capable of listing the plurality of suspect subsystems, and wherein said interface is capable of receiving input indicative of the respective suspect subsystem to be further analyzed.

62. A diagnostic system according to claim 53 wherein said interface is capable of receiving data relating to remedial actions undertaken with respect at least one suspect component.

* * * * *

UNITED STATES PATENT AND TRADEMARK OFFICE
CERTIFICATE OF CORRECTION

PATENT NO. : 6,574,537 B2
DATED : June 3, 2003
INVENTOR(S) : Kipersztok et al.

It is certified that error appears in the above-identified patent and that said Letters Patent is hereby corrected as shown below:

<u>Title page,</u>
Item [75], Inventors, delete "Scott L. Nelson, Issaquah, WA (US); Glenn A. Dildy, Sammamish, WA (US)".

Signed and Sealed this

Twenty-third Day of September, 2003

JAMES E. ROGAN
*Director of the United States Patent and Trademark Office*